United States Patent [19]
Robrock, II

[11] Patent Number: 5,600,643
[45] Date of Patent: Feb. 4, 1997

[54] BROADBAND INTELLIGENT TELECOMMUNICATIONS NETWORK AND METHOD PROVIDING ENHANCED CAPABILITIES FOR CUSTOMER PREMISES EQUIPMENT

[75] Inventor: Richard B. Robrock, II, Somerset, N.J.

[73] Assignee: Bell Communications Research, Inc., Morristown, N.J.

[21] Appl. No.: 125,978

[22] Filed: Sep. 23, 1993

[51] Int. Cl.$^6$ ................................................. H04L 12/56
[52] U.S. Cl. ........................... 370/399; 370/426; 370/259; 379/115
[58] Field of Search ................................ 370/58.1, 58.2, 370/58.3, 60, 60.1, 110.1, 62; 379/34, 53, 54, 96, 229, 230, 114, 115, 202, 112, 105, 158; 348/7, 13, 15, 16; 455/4.1, 4.2

[56] References Cited

U.S. PATENT DOCUMENTS

| | | | |
|---|---|---|---|
| 4,589,107 | 5/1986 | Middleton et al. | 370/62 |
| 4,755,872 | 7/1988 | Bestler et al. | 348/7 |
| 4,769,833 | 9/1988 | Farleigh et al. | 348/13 |
| 4,890,320 | 12/1989 | Monslow et al. | 348/7 |
| 4,941,040 | 7/1990 | Pocock et al. | 348/7 |
| 5,001,711 | 3/1991 | Obana et al. | 370/102 |
| 5,065,393 | 11/1991 | Sibbitt et al. | 379/114 |
| 5,140,585 | 8/1992 | Tomikawa | 370/60.1 |
| 5,195,129 | 3/1993 | Yazawa et al. | 379/96 |
| 5,309,434 | 5/1994 | Maekawa | 379/96 |
| 5,357,276 | 10/1994 | Banker et al. | 348/7 |
| 5,392,402 | 2/1995 | Robrock | 370/60 |

*Primary Examiner*—Douglas W. Olms
*Assistant Examiner*—Chau T. Nguyen
*Attorney, Agent, or Firm*—Joseph Giordano

[57] ABSTRACT

A Broadband Intelligent Network employs an ATM fast-packet switch to route signaling cells from a calling party to a switch port directly connected to a network controller. The signaling cells carry a service request for download of a program module or data from a network resource unit to the calling party, or for download of a program module or data from the calling party apparatus to a network host resource unit, or for service circuit service to the calling party or in a connection path between the calling party and a called party, or for a message broadcast. The network controller responds to the information in the signaling cells and establishes the necessary switched virtual connections in the ATM switch to provide the requested services. A service creation program may be downloaded to the customer from the network, and used by the customer to create a new service script which is subsequently downloaded to the network for execution.

78 Claims, 21 Drawing Sheets

FIG. 5A1
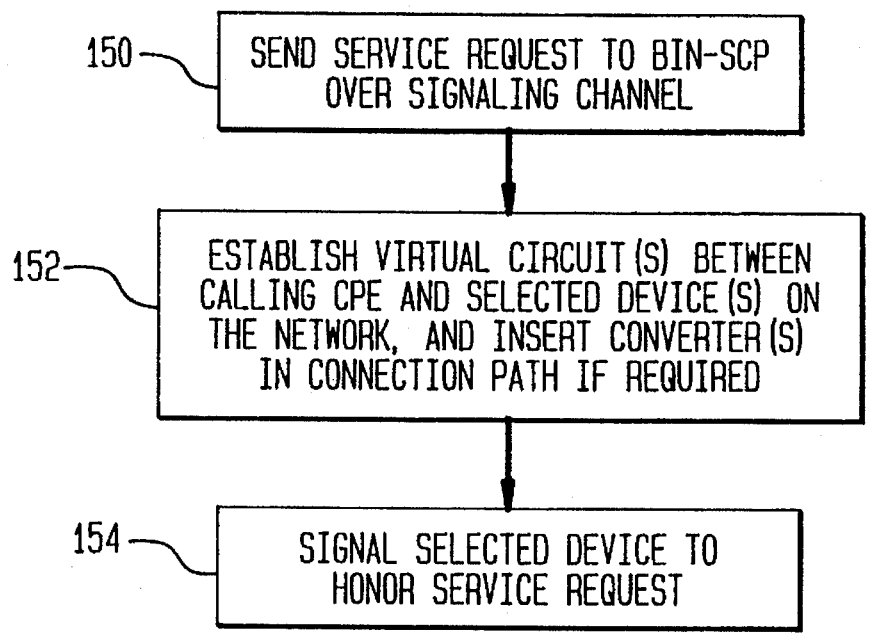
FIG. 5A2
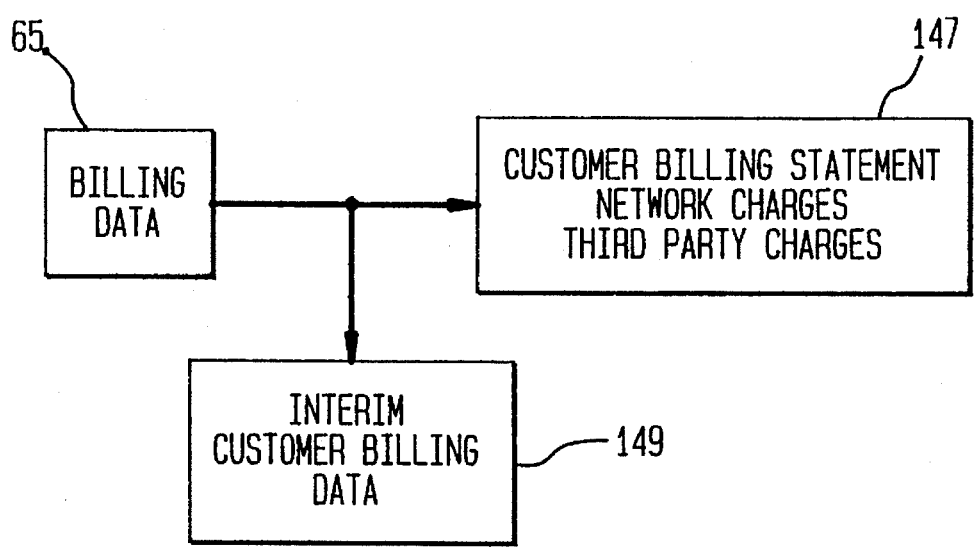

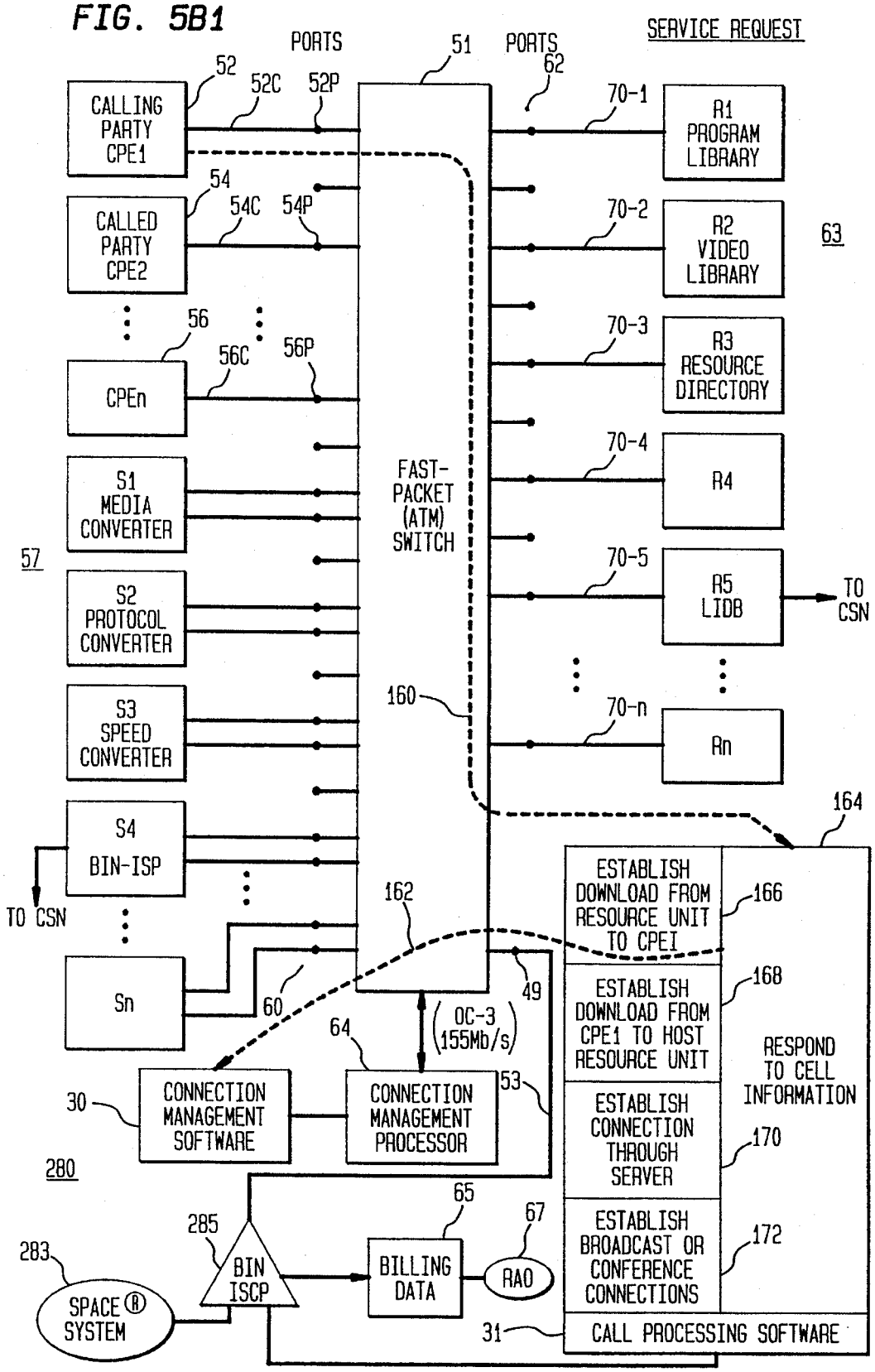
FIG. 5B1

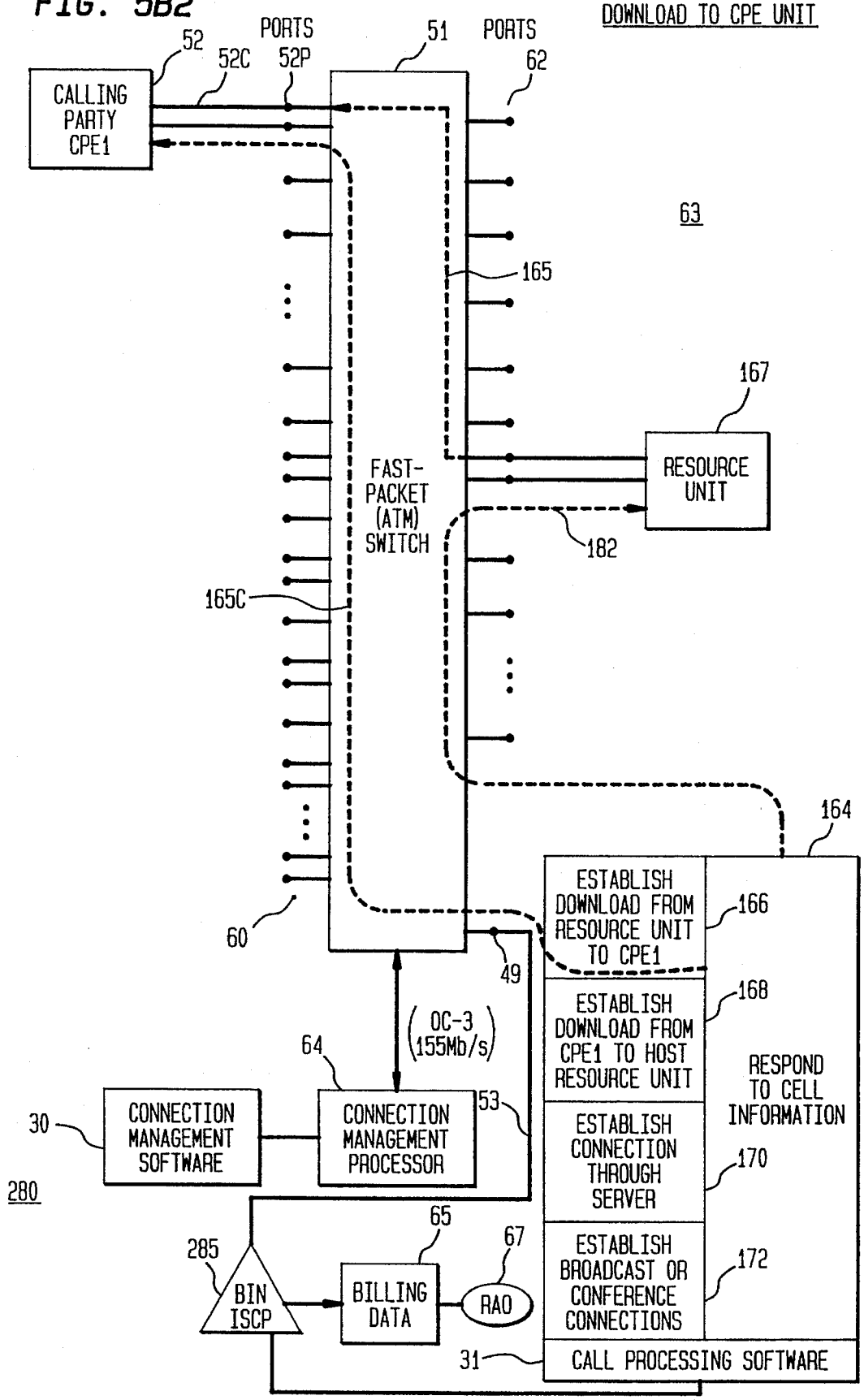
FIG. 5B2

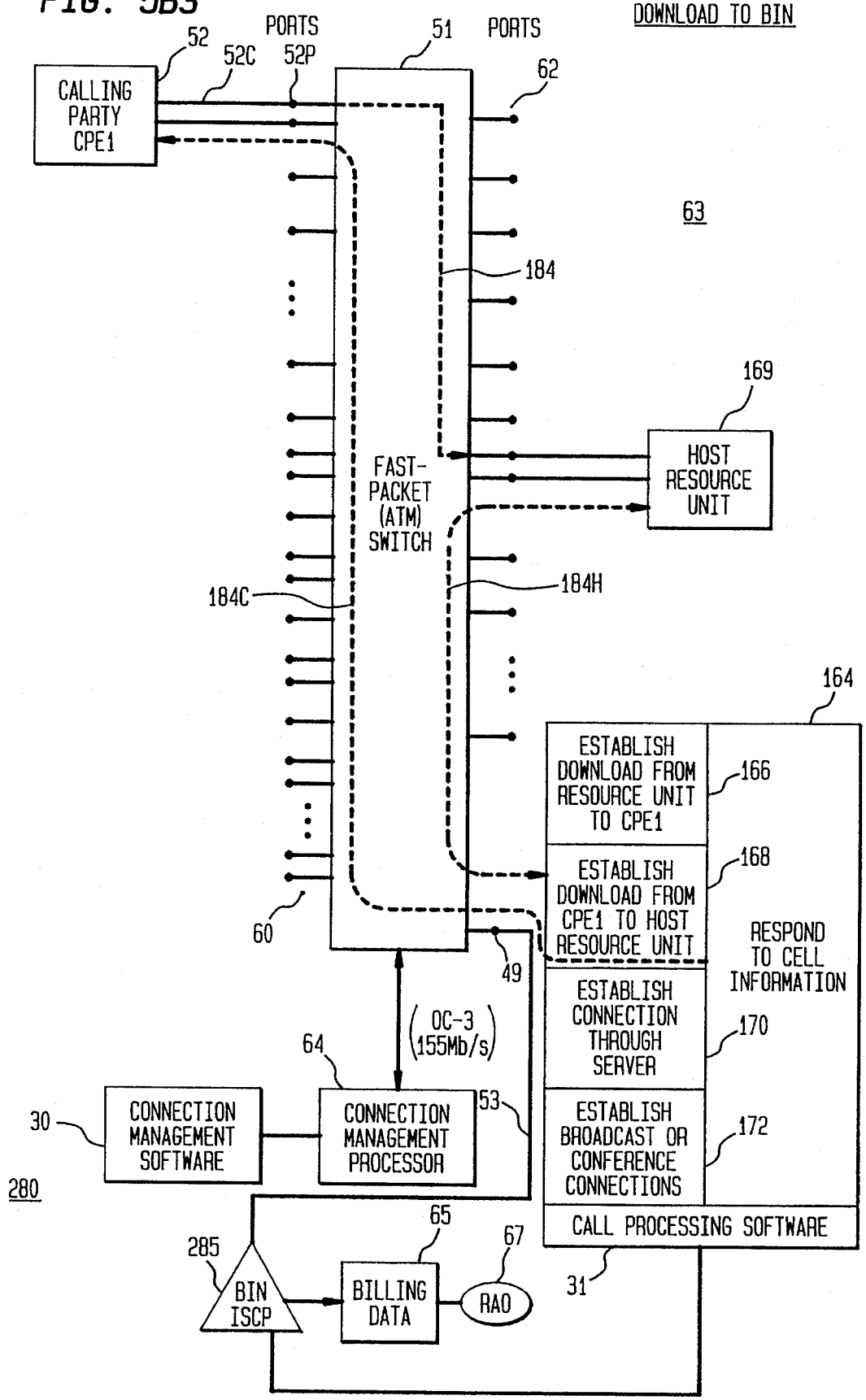

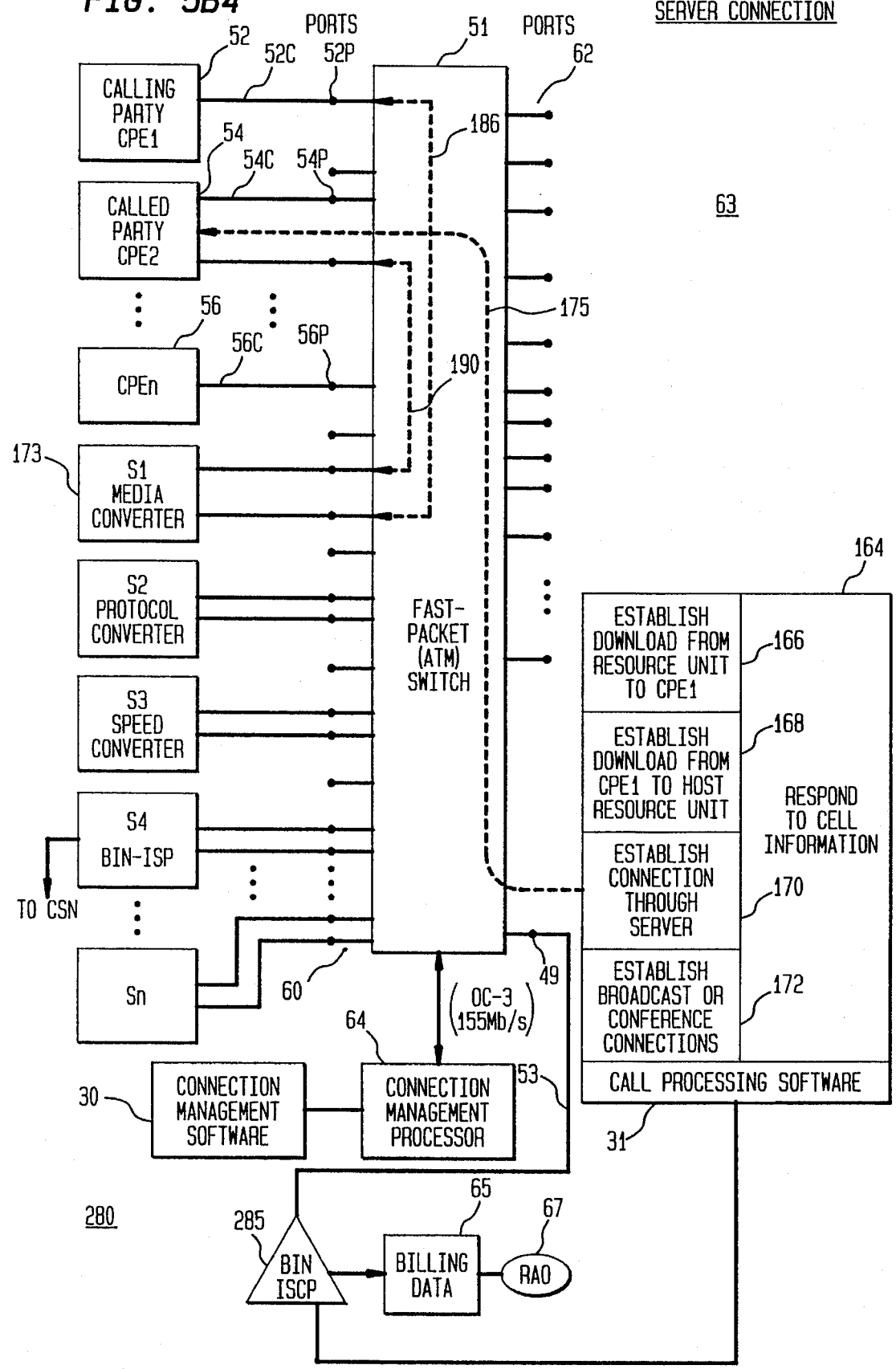
FIG. 5B4

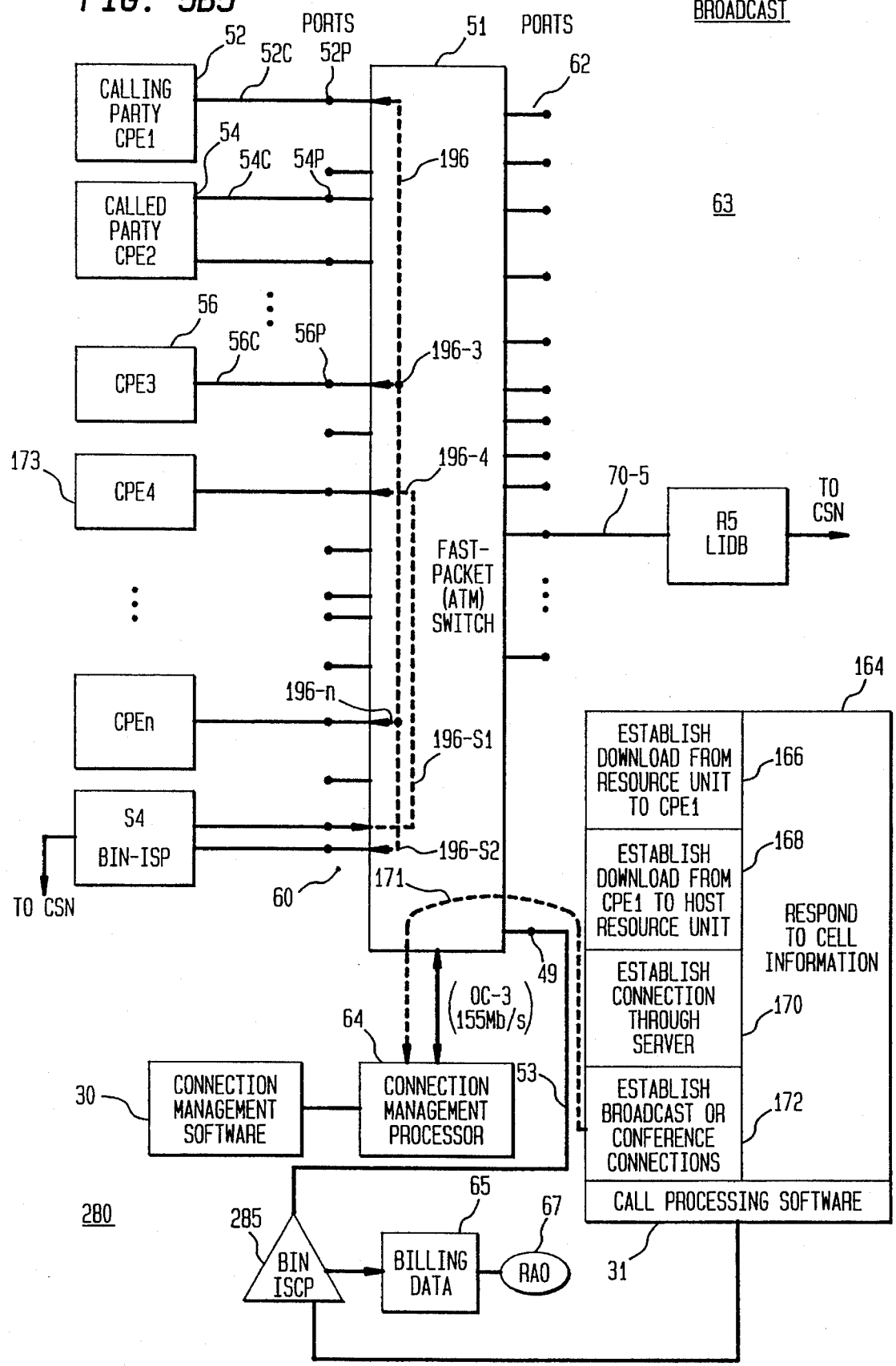

BROADBAND INTELLIGENT TELECOMMUNICATIONS NETWORK AND METHOD PROVIDING ENHANCED CAPABILITIES FOR CUSTOMER PREMISES EQUIPMENT

The present invention relates to broadband intelligent networks and methods, and more particularly to network control of services in such networks to provide significantly enhanced capabilities for customer premises equipment (CPE) on a widely available and relatively low-cost basis.

A new type of telecommunications network, known as a fast-packet network, allows all digital, broadband, multimedia communication between calling and called parties. However, fast-packet networks have generally operated without real-time network control and without network resource support available for the implementation of customer service requests. Some fast-packet switches have been designed to provide for establishing switched virtual circuits in a manner similar to the call setup function provided by exchange switches in the circuit-switched network. This basic function is limited, however, and is not readily modified or expanded.

CPE units generally have various communication capabilities and applications. For example, a telephone is a relatively simple CPE unit supporting only voice or DTMF (dual-tone multi-frequency) communication and possibly one or more operating features such as last-number-redial. A more complex CPE unit is a multimedia workstation having apparatus for voice, data, image, and video communication and a digital computer system in which various application programs can be executed.

Fast-packet networks have communication capabilities especially suitable for use by multimedia workstations and similar CPE units. Since fast-packet networks have generally offered limited or no service control capabilities, CPE design development has tended to be based on the assumption that the network is a transport medium and provides no intelligence. This has limited the services which can be offered to customers.

More recently, a broadband intelligent network (BIN) has been developed as an improved network over previous fast-packet networks. In the BIN, a Service Control Point (SCP) or an Integrated Service Control Point (ISCP) is used to provide a network control function. The SCP (or ISCP) receives a signaling cell from a CPE unit requesting that a Switched Virtual Circuit (SVC) be established to a Called Party. The SCP responds by sending a command cell with translation data to Connection Management software in an asynchronous transfer mode (ATM) or other fast-packet switch, and by subsequently alerting the Called Party through the use of a signaling cell.

The BIN provides intelligent network control of call handling and other network services as is disclosed in greater detail in the following copending applications, both of which are assigned to the present assignee and are hereby incorporated by reference: Ser. No. 08/063,661, entitled "Intelligent Broadband Communication System and Method", filed by Richard B. Robrock on May 20, 1993, abandoned, and Ser. No. 08/069,243, now U.S. Pat. No. 5,539,884, entitled "Intelligent Broadband Communication System and Method", filed as a Continuation-in-Part application of Ser. No. 08/063,661 by Richard B. Robrock on May 28, 1993.

Another system directed to use of network resources to support network services in the BIN is disclosed in the following patent application which is assigned to the present assignee and is hereby incorporated by reference: Ser. No. 08/084,386, U.S. Pat. No. 5,392,402, entitled "Broadband Intelligent Telecommunications Network and Method Employing a Resource System to Support Network Services", filed by Richard B. Robrock on Jun. 29, 1993.

While conventional art has embedded intelligence in CPE units in the manner described above, such intelligence has limited functionality. Further, conventional art fails to provide any direction for applying network control in a fast-packet network or the BIN to enhance CPE operational and communication capabilities.

DISCLOSURE OF THE INVENTION

Accordingly, the present invention is directed to providing a BIN in which CPE units are provided with significantly enhanced operational and communication capabilities through interaction with intelligence in the BIN.

A broadband intelligent network comprises a fast-packet switch having a plurality of ports and a switch processor for managing port connections to establish switched or permanent virtual connections between ports. Respective customer links having a relatively broad digital bandwidth are connected to predetermined customer switch ports for transporting signaling and data cells to and from respective CPE units.

A network control processing system is interfaced to at least one switch port to receive customer generated signaling cells carrying customer service request data and to control network responses thereto. A resource system for the network has a plurality of resource units interfaced to respective resource unit ports of the fast-packet switch to receive query cells from the network control processing system and to transmit response cells.

The switch processor detects each customer generated signaling cell received by the switch and routes each customer generated signaling cell through a first virtual circuit and at least one switch port to the network control processing system.

The network control processing system detects service request data in each signaling cell requesting downloading of a program module or data from the network to the requesting CPE or from the requesting CPE to the network. The network control processing system further directs the switch processor to establish a second virtual circuit in the fast-packet switch between the requesting CPE and a host or source resource unit if a host or resource unit connection is required by the service request.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate a preferred embodiment of the invention and together with the description provide an explanation of the objects, advantages and principles of the invention. In the drawings:

FIG. 5A1 provides a generalized overview of the operation of the invention;

FIG. 5A2 is a block diagram that provides an overview of a billing function;

FIGS. 5B1 through 5B5, considered together, provide a more detailed overview of the structure and operation of the invention;

BEST MODE OF THE INVENTION

Figure 1:
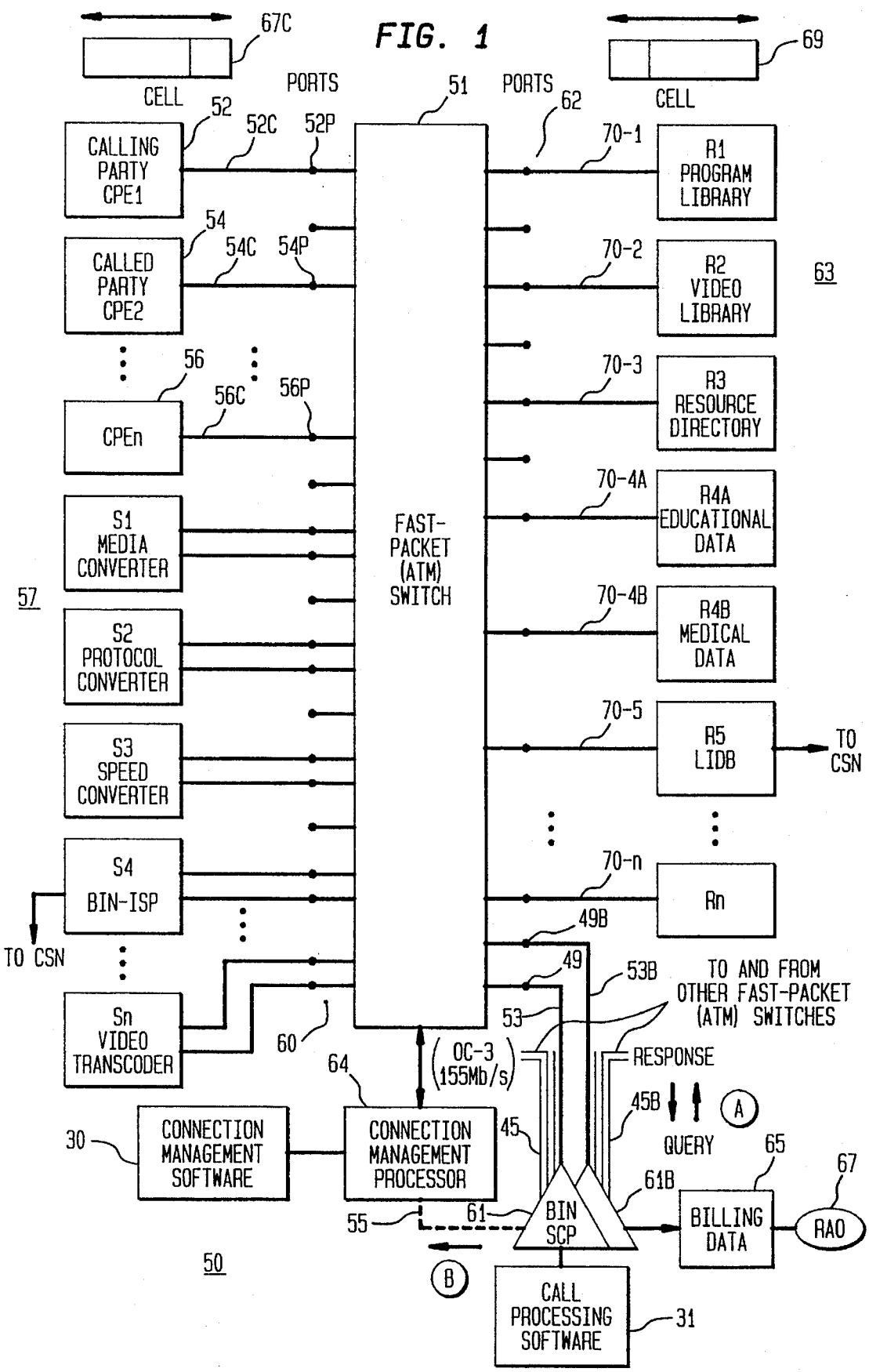
FIG. 1 is a system block diagram of a BIN having a service control point (SCP), CPE, resource units and servers connected to a fast-packet or ATM switch and arranged in accordance with the invention to provide enhanced capabilities for the CPE.

The present invention is directed to a BIN in which a network controller is arranged to make network resources (including resource directories), servers and converters available to CPE interfaced with the BIN and thereby provide improved support for customer-requested services and significantly enhance the operational and communication capabilities of the CPE. The network resources available for CPE support and enhancement include program, information, and entertainment libraries and other resource units structured to meet customer needs as well as certain resource units existing in the circuit-switched telephone network and capable of being interfaced for operation with the BIN. Network servers are structured especially to enhance CPE communication capabilities.

Resource units for the BIN can host computer programs and video libraries that contain electronic games, movies, educational videos, music videos, catalogs for home shopping, video yellow pages, market research, recent soap operas, recent local, national and international news, investment-related news and services, etc. CPE programming can be interactive, for example, to enable a customer to employ menus to select different endings for a movie or to order concert tickets or other available items, etc. The invention enhances CPE capabilities by making the resources contained in the BIN resource units widely available to CPE in response to customer requests.

In accordance with the invention, BIN resource units support CPE units under network control, with information for early developed multimedia applications that allow an individual to sit at a terminal to learn about a particular subject. These early multivideo applications use stored video images, text, audio, and data to achieve a multisensory and interactive learning experience.

The invention further enhances CPE capabilities relative to new multimedia applications being designed for use by work groups. Examples of such collaborative multimedia applications include building a marketing presentation quickly using video clips, data and stored photos from geographically dispersed offices, or, on short notice, gathering six highly experienced neurosurgeons at different workstation locations around the nation to review CAT scans, X-rays, medical data and notes for a critical medical case.

Existing resource units in the circuit-switched telephone network that can be interfaced for operation with the BIN include a system for creating programmed customer services called the SPACE® system and server units such as the Intelligent Services Peripheral (ISP). The invention employs such existing resource and server units in various ways to enhance CPE capabilities.

The invention thus enables extensive network-controlled support to be provided for CPE units, and thereby enables CPE units, such as personal computers, or television-based CPE stations, or workstations to provide the user with a "window to the world".

Examples of the present preferred embodiments of the invention are illustrated in the accompanying drawings and will now be described in detail.

In FIG. 1, a BIN 50 of the invention is structured and operated on the basis of fast-packet technology. As used herein, a fast-packet network means a network that transports digital data in packets at high transport rates (typically megabits per second) with sub-millisecond switch delays and without retransmission of errored packets.

The BIN 50 includes a fast-packet switch 51 preferably in the form of an ATM switch. The fast-packet switch 51 has a plurality of two-way ports 60 and 62, each of which may be provided with fiber optic links, respectively, to subscribers. A fiber optic link or connection herein means a connection established wholly or partly using fiber optic facilities. Each fiber optic link can provide connections for multiple subscribers. Other media such as coaxial cable or wire pairs may be employed where appropriate at lower speeds.

The BIN 50 further includes a connection management processor 64 having connection management software 30, a network control system called a BIN Service Control Point (BIN-SCP) 61, and a backup BIN-SCP 61B. A system 63 of resource units R1 through Rn are interfaced to respective ports 62 of the ATM switch 51 either by direct connection as shown or by indirect connection through other ATM switches (not shown) or by other indirect connection through multiplexer circuitry (not shown) or other interface circuitry (not shown). Accordingly, the term "interfaced" as used herein regarding connection of a resource unit or a server unit to a fast-packet or ATM switch port is intended to mean a "direct" connection to the port or an "indirect" connection to the port through one or more fast-packet or ATM switches and/or through multiplexer or other interface circuitry. It is noted, for example, that multiplexer interface circuitry would be employed where it is desired to achieve economy with shared port usage.

At least some of the resource units R1 through Rn and resource data directly accessible by the BIN-SCP 61 are operated in accordance with the invention to provide enhanced CPE capabilities.

A regional accounting office (RAO) 67 is directly accessed by the BIN-SCP61 and processes billing data 65 transmitted from the BIN-SCP 61.

As used herein, the term "resource unit" means a facility that accesses or provides current information, such as real-time video or time or temperature, or contains recorded information such as voice information, image or video information, program information, or user or corporate data. The term "data base" means a resource unit that contains data useful in supporting customer services.

Service request or call processing software 31 is provided for the BIN-SCP 61. The BIN-SCP 61 is generally structured as described in the copending applications Ser. No. 08/063,661 and Ser. No. 08/069,243.

Each customer has a CPE unit that is connected directly or indirectly to an ATM fast-packet switch port. A calling party CPE 52 (CPE1), a called party CPE 54 (CPE2) and additional CPE units through CPEn 56 are representatively shown with respective ATM switch port connections 52C, 54C and 56C to ports 52P, 54P, and 56P.

The resource system 63 may include a plurality of separately accessible data bases or other resource units at various locations. The resource units R1-Rn include units owned by the BIN owner(s) and further may include other units owned by third parties and made available to the BIN 50 at contracted billing rates.

Resource information needed for a particular network service may reside in the BIN SCP 61 or at a separate resource unit location. Alternatively, such information may reside in a plurality of geographically distributed resource units or data bases.

The resource units R1 through Rn include units that are employed in accordance with the invention to provide enhanced CPE capabilities as well as other units employed by the BIN 50 for other purposes. The R5 LIDB, which exemplifies the latter type of resource unit, is for operation in the BIN 50 to provide support for call connection services as more fully described in the aforementioned copending application Ser. No. 08/084,386.

A resource directory R3 is a Linking Directory database that is preferably included in the resource system 63 to provide an index to available network resources for use by the BIN-SCP 61 in executing customer requests for resource support needed for enhancement of CPE capabilities. Alternatively, the resource directory may be resident in the BIN-SCP 61. The Linking Directory R3 is, in effect, a directory of directories in that it provides links to the directories of remote databases to facilitate locating information in those databases. More detailed information on a Linking Directory is presented in U.S. Pat. No. 5,239,577, issued Aug. 24, 1993, assigned to the present assignee, which is hereby incorporated by reference.

The BIN 50 further includes a server system 57 having a plurality of servers S1 through Sn, of which at least some are operated in accordance with the invention to provide enhanced CPE capabilities. Each server is generally structured with service circuitry to provide a special service on request by calling parties. The servers S1 through Sn include servers existing in the circuit-switched network and interfaced for operation with the BIN 50 as well as servers structured for operation only in the BIN 50.

Certain servers operate to provide system compatibility between calling and called parties. The server S1 is a media converter that converts data from one medium to another medium to enable communication between parties having different communication apparatus. The server S1 provides various conversions including E-Mail to facsimile and text to speech. Other compatibility servers include a server S2, which provides protocol conversion when needed and a server S3 which provides transmission rate conversion when needed.

In this preferred embodiment, the server Sn is a video transcoder that is included in the BIN 50 or 280 for insertion in video communication paths to convert a video signal from the encoding scheme employed by a video transmitter to a different encoding scheme employed by a video receiver. Calling and called parties equipped with CPE units with different encoding schemes can thus conduct video communication with each other when the video transcoder service is executed on request by one of the parties or is automatically provided by the network controller on the basis of stored customer data.

An Intelligent Services Peripheral (ISP) S4 is a server unit having service circuits that provide certain basic services such as speech synthesis, voice recognition and voice recording and playback when requested by a calling or called party. The ISP S4 may be a server dedicated to the BIN or a server that exists in the circuit-switched network (CSN) and is adapted to be operational in the BIN 50 in accordance with the invention to provide enhanced CPE communication capabilities.

The fast-packet (FP) switch 51 can be embodied in various forms, with some variation in the manner in which transmitted data is organized. For example, current state-of-the-art FP switches include ATM switches (data organized in fixed-length packets called "cells"), SMDS switches, and frame relay switches. Accordingly, as used herein, the term "cell" means a basic data packaging unit regardless of whether the unit is called a "cell", a "packet", or other name in the particular technology used to apply the invention.

In the preferred embodiment(s) of the invention, ATM switches are employed for fast-packet switching. An ATM switch is a connection-oriented switch, which may have up to 1000 or more ports, employs virtual connections, and operates with fixed length data packets (cells). ATM switches can handle signals with transport rates of 155 Mb/s or greater and they introduce only sub-millisecond delays in transit time and in delay variability. The maximum expected delay through an ATM switch is 150 microseconds.

The asynchronous transfer mode used in ATM switches is a CCITT standard for packaging, multiplexing, and switching end user digital information in fixed length data packets (cells), 53 bytes (octets) in length. The data cell, indicated at 67C and 69 in FIG. 1, includes a header, to which 5 bytes are assigned, and a payload portion, to which 48 bytes are assigned.

The cell header normally contains both a Virtual Path Indicator (VPI) and a Virtual Channel Indicator (VCI). VPIs and VCIs are used to determine the routing of cells through permanent or switched virtual connections. These connections are termed virtual because they exist in the physical sense only for as long as a cell traverses the ATM switch.

The self-routing ATM switch uses the port identity and the VPI/VCI of incoming cells to establish the proper output port to which each cell should be routed based on lookup tables. The lookup (or translation) tables tie a cell with a particular label from a particular input port to a specified output port and give the cell a different label.

Signaling cells are preferably used to establish switched virtual connections through the ATM switch 51. As used herein, a "signaling cell", a response cell, a command cell, a data cell or other ATM cell may be a single cell or a sequence of cells. Preferably, a signaling cell has the same format as the ATM cells described above. Signaling cells generated by a calling CPE request a particular service and contain the information in their payload necessary to provide the requested service, such as to complete a connection to another CPE, i.e., calling party address, called party address, billing information, digital bandwidth required, personal identification number (PIN), Calling Card number, etc. Signaling cells can be identified by unique values of the VPI and VCI or by a unique payload type code. If desired, the recently developed Q.93B signaling protocol may be used with the BIN 50.

In the BIN 50, the BIN-SCP 61 is connected to a port 49 of the ATM switch 51, preferably through a direct fiber optic link 53. If the ATM switch 51 is handling OC-3 at 155 Mb/s, as shown, the interface with the BIN-SCP 61 is preferably at the same 155 Mb/s rate. Preferably, a backup BIN-SCP 61B is connected to ATM switch port 49B through direct connector 53B to provide network-controlled services with extremely high reliability. If the BIN SCP 61 fails, the BIN SCP 61B immediately takes control of network services. The BIN-SCP 61 or 61B can share ports 49 and 49B, respectively, with other devices. As such, multiplexing equipment, etc., may be present in the connection between the BIN-SCP and the switch port. The BIN-SCP 61 or 61B may also be interfaced (not shown) with a circuit-switched network to provide network controlled services therein as more fully set forth in the aforementioned copending application Ser. No. 08/063,661.

As indicated by the respective reference characters 45 and 45B, the primary and backup BIN-SCPs are also preferably directly connected to ports of other ATM switches (not shown). In an alternate embodiment, routing to (or from) other ATM switches can be through the ATM switch port 49 or 49B and through a permanent virtual connection in the ATM switch 51 to the destination ATM switch (not shown). Permanent virtual circuits would also be established in the destination and any intermediate ATM switches.

The respective resource units R1 through Rn of the resource system 63 are also connected to respective ATM ports 62 through direct links 70-1 through 70-n. Accordingly, queries can be sent from the BIN-SCP 61 through the ATM switch 51 to the resource units R1 through Rn to obtain resources needed to process customer requests for CPE enhancement.

Figure 3:
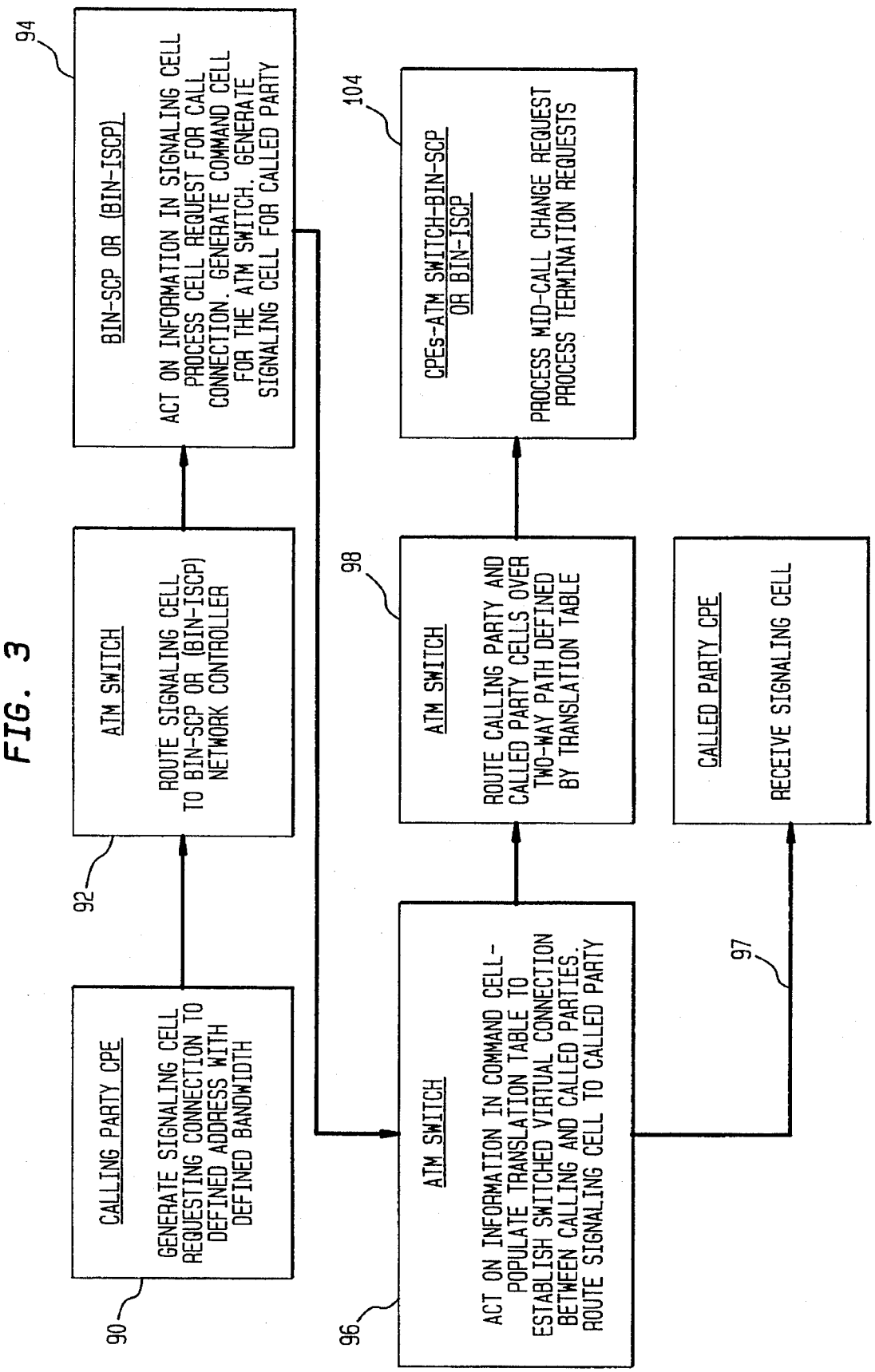
FIG. 3 is a system functional diagram that illustrates the operation of the system in FIG. 1 or 2 when a request has been made for call connection service.

Certain aspects of the invention require establishment of a call connection. The operation of the BIN 50 in establishing a call connection is illustrated by the functional block diagram in FIG. 3. As indicated in block 90, the calling party CPE 52 (FIG. 1) generates a signaling cell to request a connection to a called party 54 or a network device, e.g., a resource unit, at a defined address (directory number) with a defined bandwidth corresponding to voice, data, image, or video.

As shown for block 92, the ATM switch 51 routes the signaling cell through a permanent virtual circuit to the BIN-SCP 61 which, in block 94, acts on the cell information and processes the request for a call connection and thereafter generates a command cell for the ATM switch 51 to establish the connection. In addition, a signaling cell is generated for the called party.

The ATM command cell and the called party signaling cell are sent directly to the ATM switch 51 through port 49 (FIG. 1) as indicated by block 96. In response to the ATM command cell, the connection management processor of the ATM switch 51 acts on information in the command cell and populates its translation table in accordance with the received command, thereby establishing a two-way switched virtual connection between ATM ports 52P and 54P of the calling and called parties. In addition, the signaling cell generated by the BIN-SCP 61 is immediately routed through the ATM port 54P to the called party as indicated by reference character 97.

As indicated in block 98, once the called party answers the call, the ATM switch 51 routes calling and called party cells 67C and 69 (FIG. 1) through a two-way, switched virtual path. The translation table defines the two-way path so that each party receives the voice, data, image, and/or video cells transmitted by the other party.

As represented by block 104, system elements of the BIN 50 can be operated during the call to process mid-call bandwidth changes or other requests or to process a call termination request. Thus, the CPE units 52 and 54, the resource unit 63, the server unit 57, the ATM switch 51, and the BIN-SCP 61 are operated to establish call changes or a call termination in a manner similar to that described for the original connection service. BIN operations to establish call connections, make mid-call changes, and terminate calls are more fully explained in the aforementioned patent applications Ser. No. 08/063,661 and Ser. No. 08/069,243.

In controlling the operation of the resource system 63 and the server system 57 to provide enhanced CPE capabilities in accordance with the invention, the BIN-SCP 61, may transmit query cells to resource units and command cells to server units and the ATM switch 51. Switched virtual circuits are established in the ATM switch 51 to route response cells from server and resource units to specified addresses. Network control of the resource and server systems 63 and 57 is described more fully subsequently herein.

Figure 2:
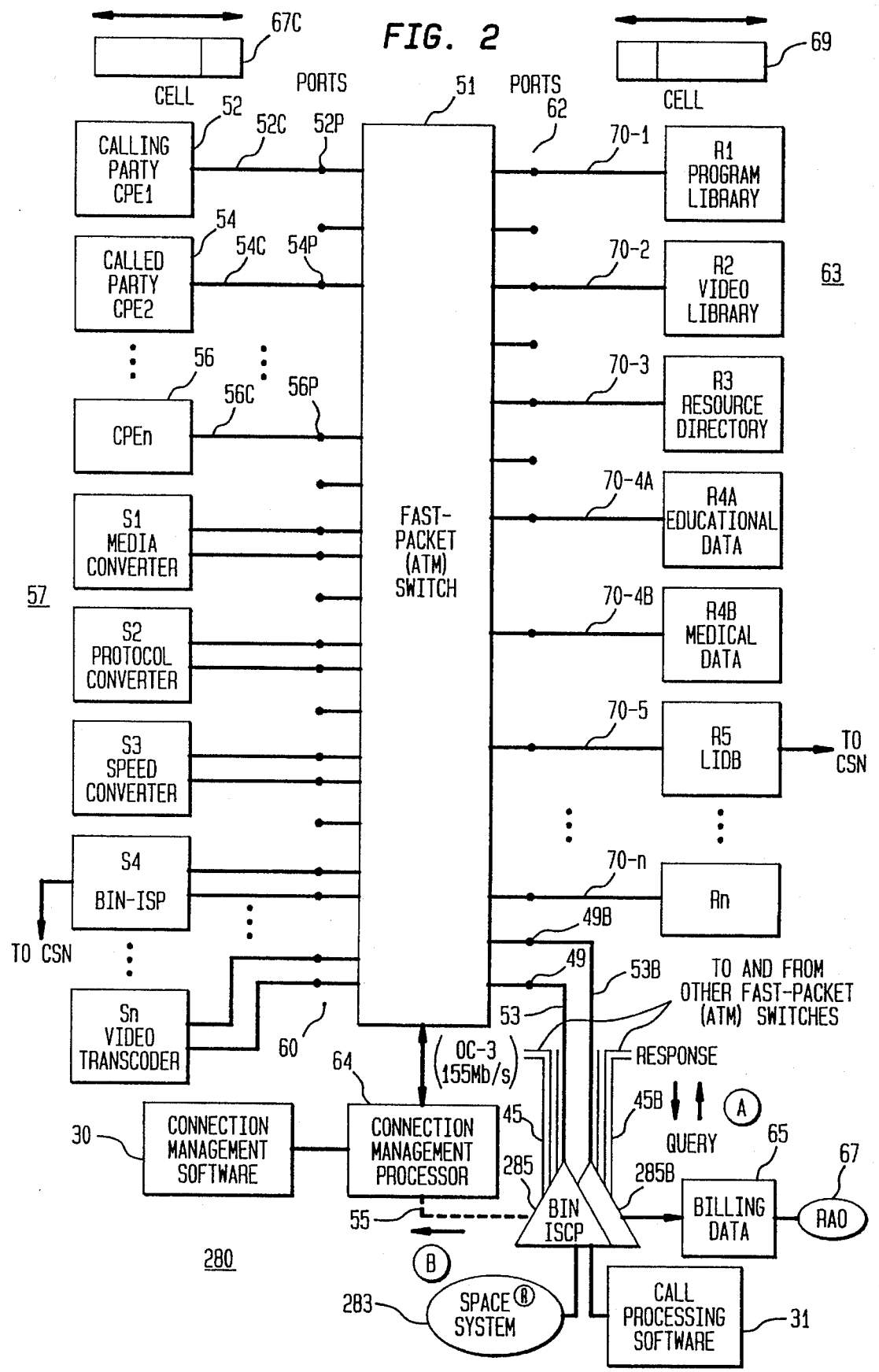
FIG. 2 illustrates a system block diagram of another embodiment of the invention in which a broadband advanced intelligent network (RAIN) has an integrated service control point (ISCP) with a SPACE® system, CPE, resource units and servers connected to a fast-packet or ATM switch and arranged in accordance with the invention to provide enhanced capabilities for the CPE.

In another embodiment of the invention shown in FIG. 2, a BIN Integrated Service Control Point (BIN-ISCP) 285 or 285B is interfaced directly with the ATM switch 51 in a broadband advanced intelligent network 280 and provides network control with enhanced CPE capabilities in the manner described for the BIN-SCP 61 or 61B. Like reference characters are employed for like elements in FIGS. 1 and 2.

Command cells are generated by the BIN-ISCP 285 or 285B and transmitted through the switch port 49 or 49B, thereby populating a translation or lookup table in the connection management processor 64. Switched virtual connections are thus established and terminated for voice, data, image, and video communication cells as previously described. Command data may alternatively be transmitted through the link 55. In addition, the BIN-ISCP 285 sends signaling, command and query cells to CPE units and resource and server units for communication and control purposes as described for the BIN-SCP 61.

The BIN 280 of FIG. 2 differs from the BIN 50 of FIG. 1 principally through the provision of a SPACE® system 283 and appropriate SCP structuring to provide for rapid creation of new network services.

As described more fully hereinafter, the SPACE® system is a resource normally resident in the BIN-ISCP 285 and, on customer request, can be downloaded by the BIN-ISCP 285 to CPE units for customer use in creating new services. Such new services are installed at the network level for customer use under network control. If desired, the SPACE™ system may be stored in a separate resource unit (not designated) in the resource system 63.

Figure 4:
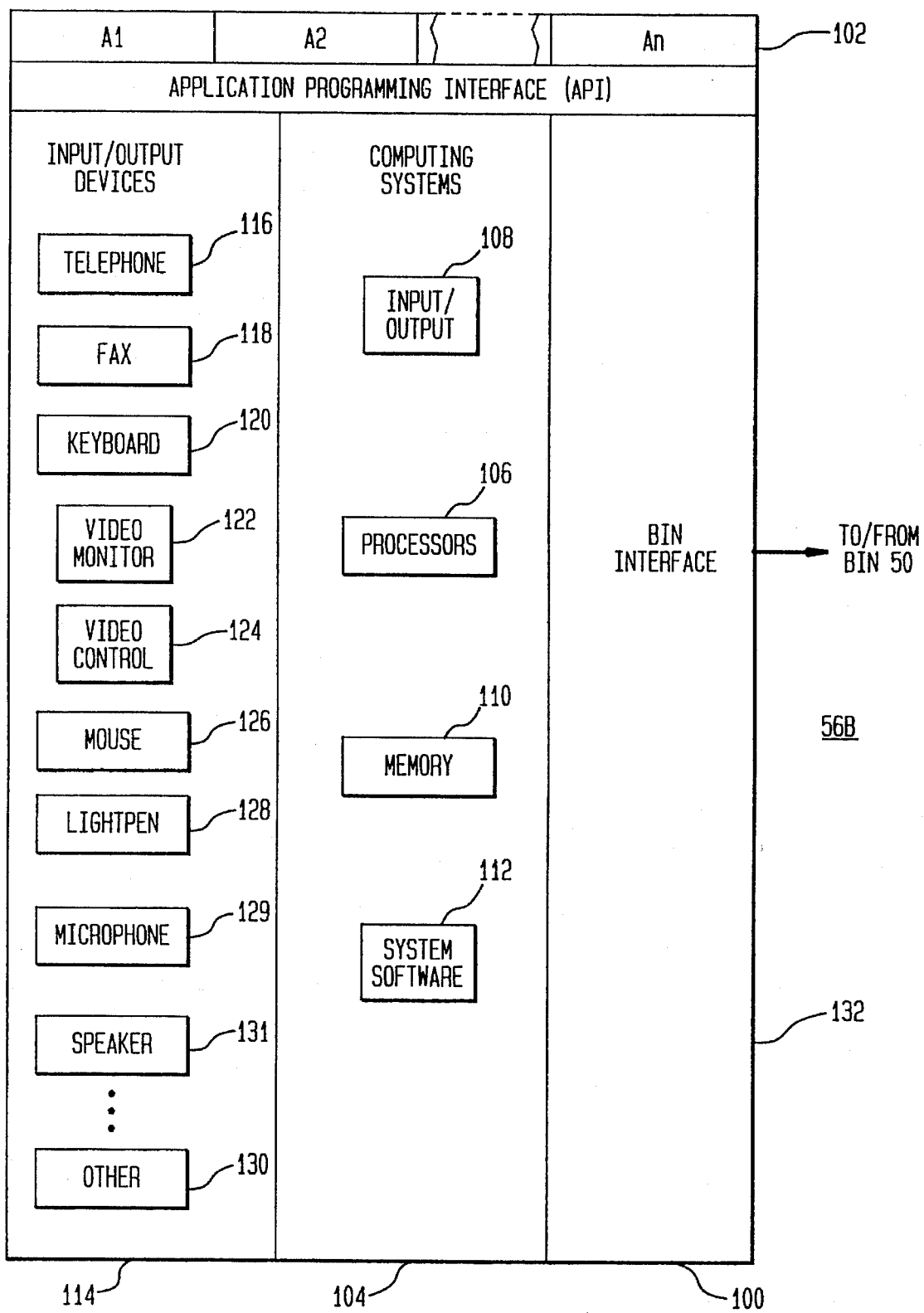
FIG. 4 shows a block diagram of a basic configuration for a workstation employed as CPE in the network of FIG. 1 or FIG. 2.

The generalized structure of a multimedia CPE unit 56B is shown in greater detail in FIG. 4. The CPE 56B may be employed to embody the CPE units 52, 54, and 56 in FIGS. 1 and 2.

The CPE 56B has an apparatus and computing platform 100 on which a set of application programs A1 through An 102 may be executed. An application program interface API is provided for the platform 100. The structure of the API depends on the design of the CPE unit. Accordingly, different versions of an application program are required for different APIs employed by different CPE units. Some of the application programs may be permanent residents of the program set 102, while others may be programs downloaded from the network level for temporary residence and use. Downloaded and resident application programs may include commercially available programs such as word processing, spreadsheet, desk-top publishing, investment management, and income tax preparation programs, as well as customer developed or other special programs. Program downloading to the CPE 56B enables the customer to avoid costly purchases of new application software and relatively frequent software updates.

The apparatus and computing platform 100 of the CPE 56B includes computing systems 104 having processors 106 for which input/output subsystems 108 and a memory system 110 are provided. Resident system software 112 controls processor 106, memory 110, and input/output 108 operations.

Input/output devices 114 include a telephone 116, a facsimile machine 118, a keyboard 120, a video monitor 122, and a video controller 124. A mouse 126, a light pen 128, a microphone 129, and a speaker 131 may also be provided for operator use. As indicated by a block 130, the CPE 56B may include various other input/output devices (not specified). In embodying the invention, various combinations of the illustrated input/output devices may be employed according to customer needs.

In the outgoing direction, BIN interface circuitry 132 packages CPE output in cells, multiplexes those cells into a single bit stream, and adds the appropriate housekeeping bits required by the format of the ATM transport signal, e.g., OC-3. In the incoming direction, the BIN interface circuitry 132 frames on the incoming bit stream, checks for transmission errors, and extracts the transmitted cells for further CPE processing.

CPE units in conventional fast-packet networks have not benefited from network intelligence and a presence of network servers, converters, and resource units. In accordance with the present invention, in the BIN 50 or 280, CPE units are advantageously provided with enhanced capabilities, i.e., extended communication capabilities, expanded information access, and expandable personality as a result of network control of network resources or service circuits provided by the BIN-SCP 61 or the BIN-ISCP 285 in response to customer service requests. Switched virtual circuits are established to all parties and resource or server support units, as needed, to satisfy service requests.

As indicated, the BIN may be used to download "personality" to CPE units. For example, "personality" may be downloaded to a CPE unit by a downloading of personality software that consists of system and application software to provide the CPE with the ability to interact with the network in a prescribed fashion. As an illustration, a multimedia workstation might be structured and instructed through downloading to behave like a commercial television unit and thereby accept video broadcasts over a broadband network.

In supporting the provision of requested services under network control, the ATM switch 51 functions as a transparent switch, i.e., with relatively little embedded intelligence. Accordingly, the ATM switch 51 is free of burdens and restrictions that embedded intelligence can otherwise impose. As a whole, the BIN 50 can provide free communications without any "firewalls" between the BIN-SCP 61 or BIN-ISCP 285 and any CPE, resource unit, server unit, or other system having a direct or indirect port appearance on the ATM switch 61.

As explained, the BIN-SCP 61 downloads software programs or video or data to the CPE of the calling or called party. It performs downloading from its own data base or by locating the software or information in another system in the BIN 50 and establishing a switched virtual circuit between that system and the CPE targeted to receive the information. Similarly, the CPE can download software programs or information to the BIN-SCP 61, which serves as the ATM network controller, or to another host system in the BIN-50.

CPE units have access to expanded information through access to a video Juke box, i.e., video-on-demand, provided by a video library resident in the resource unit R2. Videos may be downloaded in real time or at a fast transmission rate and stored for CPE replay at the normal play rate with video control provided by the video control 124 (FIG. 4). CPE units also have access to a program library resident in the resource unit R1 from which programs can be downloaded for use in the CPE apparatus as previously described.

CPE units also have significantly and conveniently expandable programmability. Thus, network programs can be downloaded on demand from the resource unit R1 to a CPE unit. Downloaded programs may include system and/or application programs. Since the API of each CPE may be recorded in the network, a proper program version can be automatically downloaded. Alternatively, a desired program version can be requested by the CPE user.

Multimedia applications are sometimes categorized by application class—messaging, publishing, information access, and interpersonal communication. For any of these applications, the CPE, belonging to either the calling or called party or both, can request the BIN-SCP 61 to download application software that gives the CPE the personality it requires for a given application. This may involve downloading a software program so that the CPE can exhibit the behavior expected of a given class of Broadband Integrated Services Digital Network (ISDN) CPE, or it may involve downloading commercial applications like spreadsheet or word processing programs, or it may involve downloading the SPACE® service creation system, or it may even involve downloading a video game. To accomplish this task, the BIN-SCP 61 first determines where the required program or data is located, either by searching its own data base or by querying the directory data base R3 in the BIN 50. Once the source has been located, a switched virtual circuit is established between the source system and the CPE to allow transfer of the information.

Medical Imaging is a multimedia application that allows physicians and other personnel to review X-Rays, CAT scans, MRIs, and other diagnostic products from remote locations. Medical data may be stored in a memory 110 (FIG. 4) of a CPE unit to provide for medical data communication to medical personnel at one or more CPE units at other locations. In this manner, diagnostic, surgical and other medical procedures can be significantly improved through nearly instant access to remotely located medical data.

Distance Learning is another multimedia application that provides a student with the ability to participate in virtually any type of educational experience from a remote location by using multimedia interactive capabilities. As shown in FIGS. 1 and 2 educational resource units such as the resource unit R4 have stored information, videos, image, etc. that can be telecommunicated to a CPE unit on request.

The BIN-SCP 61 also provides a complete billing record for its services and can bill for services provided by various resource units. In general, billing records are automatically constructed from call data, and the billing system can be structured to operate in different ways according to customer and network management needs. As previously indicated basic billing is provided by sending billing data 65 (FIG. 1 or 2) to a regional accounting office 67. The billing system (FIG. 5A2) is also structured to provide billing and collection services to third parties (including interexchange carriers and third party owners of resource units). With third party billing, a network bill 147 for a customer having a CPE unit is formatted with relevant billing data 65, including network call and connection service charges, network resource and service circuit charges, and third party charges for use of resource units and interexchange facilities.

In addition, the billing system is structured to format relevant billing data 65 for transmittal to a CPE unit after each use of the BIN or on a periodic basis as indicated by block 149. Such "real time" billing data can be used by customers for budget control or other management purposes during the time period between formal network billing statements.

In some instances, a conversion device may be required to be inserted in the transmission path between the source and the CPE or between two CPEs to enable communication between the devices. The BIN-SCP 61 also preferably operates automatically as a network controller to respond to each connection request and determine from its customer records the compatibility of any two subscriber devices to be connected and determines what, if any, conversion device unit is needed in the connection path for communication compatibility. The BIN-SCP 61 sets up one or more server(s) in the connection path so that the two subscriber devices can communicate with each other with the needed conversion service.

The CPE may also download programs or data into the BIN-SCP network controller 61 or other host systems in the BIN 50. Entirely new kinds of customer control are thus made available. In particular, a customer can create a new network service using the SPACE® service creation program and then request that the service script be downloaded into his or her customer record for subsequent use. Customer control in the existing circuit-switched network is primitive by comparison, e.g., a customer can only make minor changes such as a change in a speed call list or a call forwarding number through the use of DTMF commands.

For publishing or broadcast or conferencing applications, the ATM switch translations support a multipoint transmission capability. A customer can maintain a distribution list in his or her customer record in the BIN-SCP 61 and invoke that list to broadcast information. Alternatively, a customer can download a distribution list in real time and then request the BIN-SCP 61 to manage the broadcast. In addition, a customer can establish single media or multimedia conference calls by requesting connection service for a conference connection to multiple called addresses. In the case of broadcasting or conferencing, the BIN-SCP 61 sends command cells to connection management software in the ATM switch 61 to establish the required multipoint translations.

The general concepts of the invention are illustrated by a flow diagram shown in FIG. 5A. As indicated by block 150, CPE service requests are sent to the network controller, i.e., the BIN-SCP 61 (or BIN-ISCP 285), over a permanent virtual signaling channel through the ATM switch 51. The network controller establishes switched virtual circuits between the calling CPE and selected network devices with converter(s) inserted in the connection path if required (block 152). In block 154, the network controller signals the selected device to honor the service request.

The character and extent of enhancement of the CPE capabilities is dependent upon the nature of the service request. Generally, the customer is provided with control of services in the BIN, access to extensive resources, extended communication capabilities, and communication compatibility with otherwise noncompatible CPE units.

Block diagrams shown in FIGS. 5B1–5B5 provide a more detailed overview of the operation of the invention. In this case, the BIN-ISCP is illustrated, and it includes call processing software having a module 164 with basic software units 166–172.

A service request is made (FIG. 5B1) by a customer from the calling party CPE unit 52 (CPE1). A signaling cell is sent to the ATM switch 51 which routes the signaling cell to the network controller (BIN-SCP 61 or BIN-ISCP 285) through a permanent virtual signaling channel in the ATM switch 51. Dotted path 160 schematically represents the path of the signaling cell to the module 164 in the network controller 61 or 285.

The network controller 61 or 285 responds to the signaling cell information and generates command and/or query or other cells to provide the requested service. If a resource download has been requested, BIN-SCP block 166 optionally acknowledges the request to CPE1 as indicated by the reference character 165C (FIG. 5B2), finds the location of the requested resource, such as a resource unit 167 (which may be nondesignated block R6 in FIG. 1), and transmits a command cell over dotted path 162 (FIG. 5B1) to the ATM switch 51 to establish a switched virtual circuit from the resource unit 167 to CPE1-52. The connection management software 30 executes the command and establishes a download connection path 165 (FIG. 5B2). If the requested resource is in the network controller 61 or 285, the permanent virtual signaling channel to CPE1 may be used for the download instead of setting up a separate switched virtual circuit.

A query cell may also be sent by the network controller 61 or 285 through the ATM switch 51 to the resource unit 167 over an established virtual circuit as represented by dotted path 182 in FIG. 5B2. The resource unit 167 responds to the query from the network controller, or a query directly from CPE1, by sending response data to CPE1 over the connection path 165 in accordance with the service request. The resource unit 167, signals the network controller 61 or 285 when the download is completed so that the switched virtual circuit can then be taken down.

The network controller 61 or 285 can also function as a gateway in servicing a customer request for downloading from the network. In operating as a gateway, the network controller 61 or 285 provides a "yellow-pages-like" service. In making a gateway service request for a movie, for example, customers send a signaling cell through the ATM switch to the network controller 61 or 285. The network controller then downloads a gateway menu from the controller or a resource unit to the requesting CPE unit. The gateway menu lists the libraries of various suppliers, such as premium movie cable companies, broadcasting companies, movie companies, etc. The customer selects the desired library movie and sends a signaling cell to the network controller 61 or 285 or directly to a resource unit of the supplier. A download of a menu of available movies or videos is then made in the manner previously described. Similarly, once a movie or video is selected, it is ordered and downloaded in the manner previously described. Thus, a customer may order for viewing any available movie or video at any time.

Further, conventional VCR control functions can be applied by the video control 24 (FIG. 4) to the movie as it is viewed, i.e. fast-forward, fast-reverse, search, frame view, play, etc.

To enable video control by the customer, the movie or video can be downloaded through a switched virtual circuit as a short burst of data for storage in the CPE memory 110. The switched virtual circuit is then terminated and the movie or video may be played from storage under VCR control.

An alternate arrangement can be employed to avoid a requirement for large CPE memory capacity. Thus, the movie or video can be downloaded from the source resource unit (video juke box) through a switched virtual circuit in real time, and narrow-band CPE control messages can be sent through the switched virtual circuit to the juke box where VCR controls (not shown) are operated in response to the control messages to fast-forward, fast-reverse, or otherwise control the showing of the movie or video.

In another alternate arrangement, sequential portions of the movie can be downloaded in short time-spaced, bursts of data. In this case, the memory capacity of the receiving CPE unit is sufficient to store the downloaded data, at least one burst at a time. During the playing of any one stored burst of movie or video data, the video control 24 is operated as desired to perform VCR control functions on the currently stored data.

Facilitated network backup of customer data is available to customers through CPE-to-network downloading. Thus, a customer can use the network as a backup storage facility by downloading data, for which backup is desired, to a designated depository in the network.

If a request has been made for a download from CPE1 to a host resource unit 169 (FIG. 5B3), BIN-SCP block 168 establishes (via path 162 in FIG. 5B1) a switched virtual circuit 184 (FIG. 5B3) in the ATM switch 51 between CPE1 and the host resource unit 169. In addition, a cell is sent by the network controller 61 or 285 to direct the host resource unit 169 to accept the forthcoming download as indicated by reference character 184H. A cell is sent to CPE1 as indicated by reference character 184C to commence the download. CPE1 responds by downloading to the host unit 169 over the path 184.

A request may be made by CPE1 for a call connection to the called party CPE unit 54 (i.e., CPE2) or for another service that requires the use of a converter in the connection path. For example, a request may be made for a call connection that requires a converter 173 (FIG. 5B4), which may be the media converter S1 of FIG. 1, for communication compatibility.

BIN-SCP block 170 establishes the requested connection through the converter 173. The network controller 61 or 285 responds to the request by directing the ATM switch 51 (path 162 in FIG. 5B1) to establish the requested server connections in the requested call connection path. Paths 186 and 190 represent the connection path from CPE1 through the ATM switch 51 to the server 173, back to the ATM switch 51 and to the called party CP2. The network controller notifies the called party of the call over dotted path 175.

CPE1 may also send a request for a broadcast or conference connection which is implemented by BIN-SCP block 172. In that event, the network controller 61 or 285 responds to the signaling cell carrying the service request.

For a broadcast, the BIN-SCP block 172 first checks a stored or received address list for the customer to determine the addresses. A command cell is sent to the ATM switch 51 as indicated by dotted path 171, and the connection management software establishes switch connections from CPE1 to the identified addresses, i.e., as shown in FIG. 5B5, over paths 196, 196-3, and 196-4 through 196-n. One or more addressees, such as CPE4, may require a server such as the BIN-ISP 54. Thus, the BIN-SCP block 170 establishes a series ISP connection through paths 196-S1 and 196-S2 in the manner previously described.

For a conference call, the BIN-SCP block 172 responds to the service request and transmits a command cell to the connection management software with the necessary multipoint translations to establish the necessary two-way switched vertical circuits through the ATM switch 51 to interconnect the parties and any resource units requested for the conference. Server units are also connected through the ATM switch if needed in any of the conference connection paths.

Figure 13:
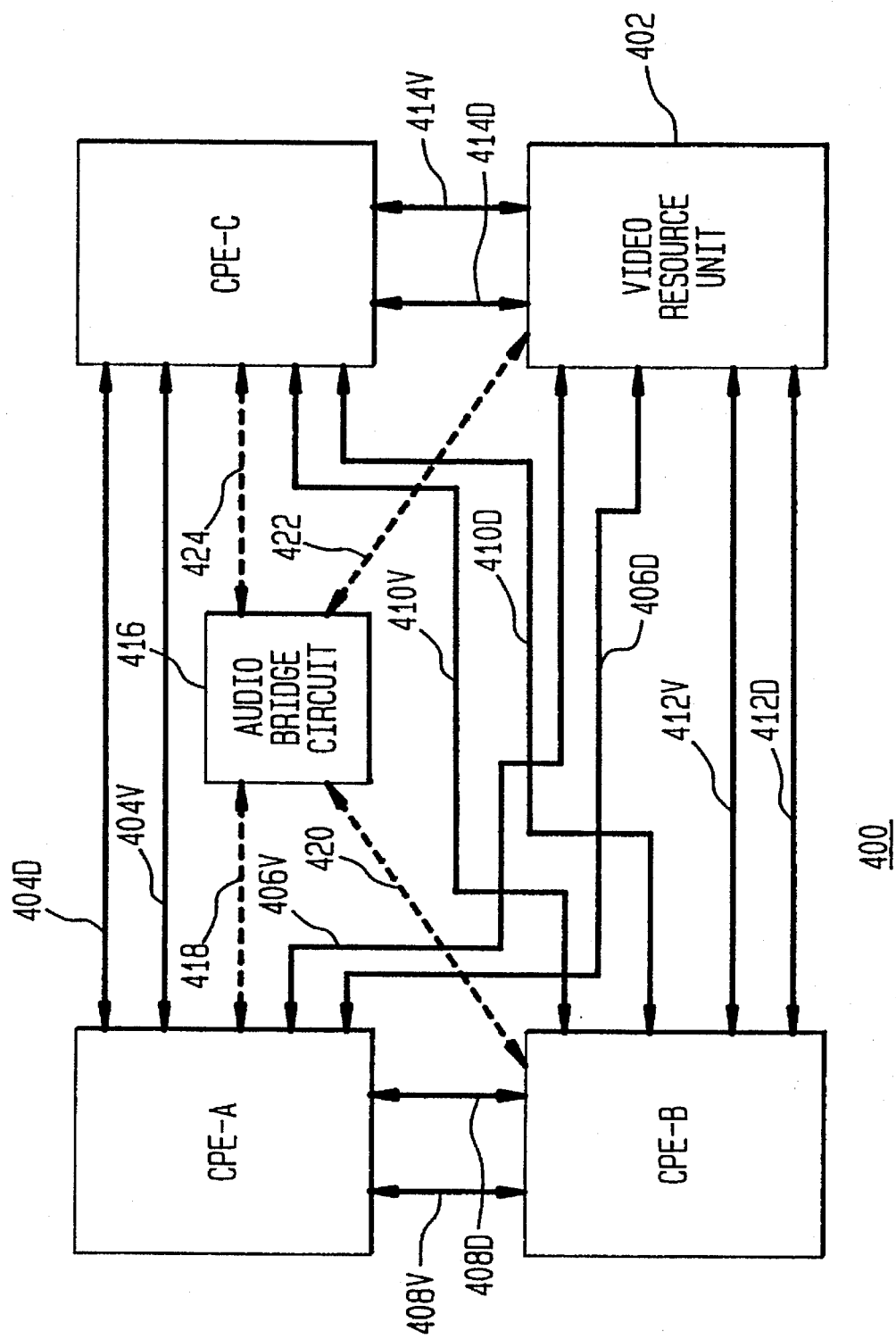
FIG. 13 is a schematic diagram of a conference call connection established in accordance with the invention.

FIG. 13 illustrates a conference call connection 400 in which CPE units CPE-A, CPE-B, and CPE-C and a video resource unit 400 are interconnected. Each of the interconnection paths includes a switched virtual circuit in one or more ATM switches, but the switched virtual circuits are not specifically shown thereby enabling the drawing to be simplified.

If the conference call is a multimedia call, voice, data, and image/video channels may be included in the connection paths. Each party normally would have respective window displays to receive images/videos over direct connections through two-way video channels 404V–414V from resource units and other parties. Data can similarly be transmitted over direct connections through two-way data channels 404D–414D. In the case of voice conferencing, an audio conferencing bridge 416 (as a stand-alone server device or as a service circuit in the ISP) is employed in two-way voice-channel connection paths 418–424 to sum all of the conferenced voice signals thereby enabling each party to hear every other party simultaneously.

In the case of a medical conference call, medical imaging data which may be stored in the memory unit 110 (FIG. 4) and a medical data resource unit R4B (FIG. 1 or 2) can be employed to provide images or videos to all conference parties simultaneously. The resource unit R4B might be located at a hospital, for example.

The operation of the BIN 50 (FIG. 1) or 280 (FIG. 2) in providing enhanced CPE capabilities is illustrated in greater detail by functional block diagrams in FIGS. 6A–10B.

A user employs a data entry device such as a keyboard to enter a service request for downloading a program module or data from the BIN 50 or 280 to a CPE unit. As shown by block 200 in FIG. 6A, the service request is received by the computing platform, i.e., a CPU, of the CPE. As indicated by block 202, the computing platform then assembles a signaling cell for transmitting the service request to the network controller, i.e., the BIN-SCP 61 or BIN-ISCP 285. During a wait period, indicated by dotted line 203, the service request is processed by the network controller 61 or 285, and the requested download is executed. As indicated by block 204, a signaling cell is then assembled and sent by the CPE computing platform to the network controller 61 or 285 to acknowledge the download so that the switched virtual circuit can be taken down.

Figure 6A:
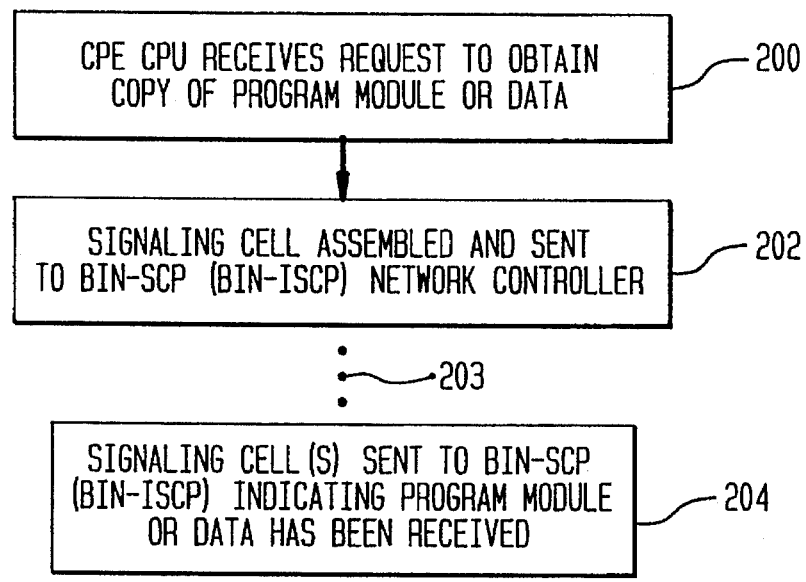
FIG. 6A is a functional block diagram representing a procedure employed in CPE in response to a request for a network download.
Figure 6B:
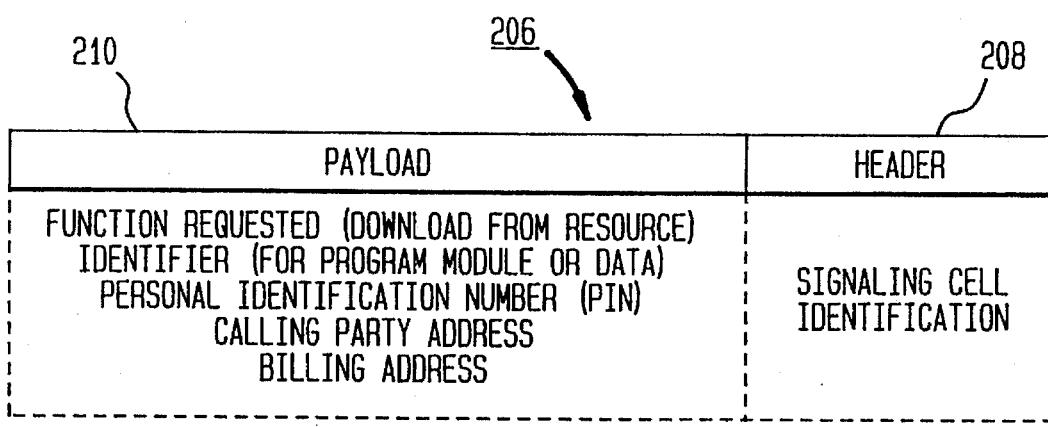
FIG. 6B graphically represents an ATM signaling cell employed to transmit a CPE request for a network download to the CPE.

An ATM signaling cell 206 is structured as shown in FIG. 6B to carry a service request. The cell includes a header 208 that carries data that identifies the cell 206 as a signaling cell. A payload section 210 carries data indicating the requested service or function (in this case, a download from a resource), the requested program module or data, and other data which could include a PIN, the calling party address, and the billing address.

Figure 7A:
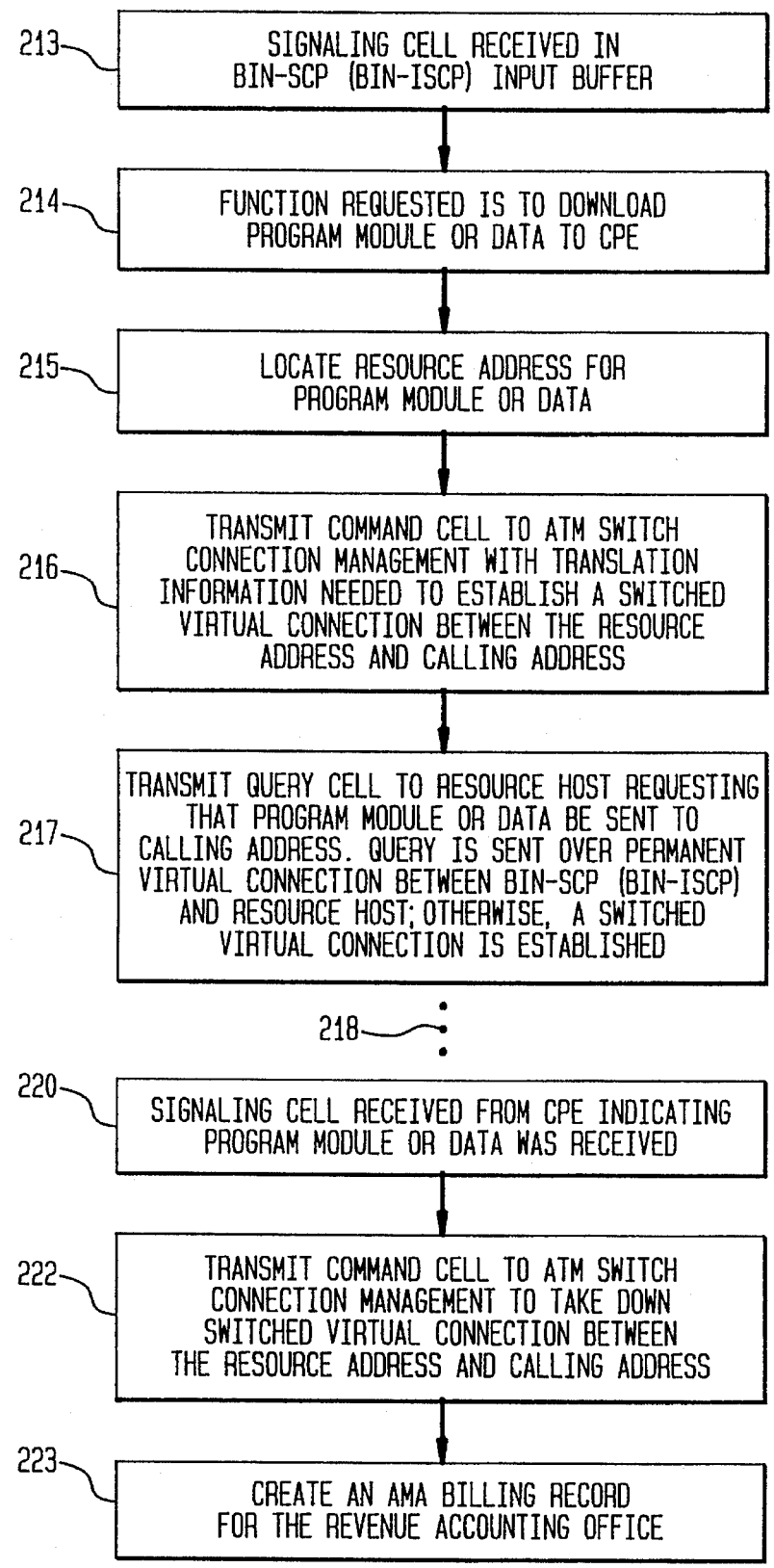
FIG. 7A is a functional block diagram representing a procedure employed in the SCP or ISCP to manage a CPE request for a network download.

In FIG. 7A, program functions performed in the network controller 61 or 285 are shown. As shown in block 213 a signaling cell from CPE1 is received in an input buffer of the network controller 61 or 285. In block 214, the requested function or service is detected to be a download, and the resource address is located in block 215.

To locate the resource address, the network controller 61 or 285 may query the resource directory R3 for search assistance. One or more resource units may be identified through the resource directory R3 to meet the requirements of the service request. Thus, the network controller operates the BIN 50 or 280 to provide added value for the requesting customer since a generalized resource request can be specifically interpreted to identify one or more resource sources that will provide the total combination of resources needed to satisfy the basic request. The network controller 61 or 285 uses the resource directory R3 to navigate through the available resource unit and thereby gather the information needed to honor the request.

A command cell is then transmitted (block 216) by the network controller 61 or 285 to the ATM switch 51 with translation information needed by the connection management software to establish a switched virtual connection between the resource address and the calling address. In addition, a query cell is transmitted (block 217) through the ATM switch 51 to the located (host) resource requesting download of the requested program module or data to the calling address. A switched or permanent virtual connection may be established through the ATM switch 51 between the network controller 61 or 285 and the host resource. Multiple resource unit connections can be sequentially established when multiple resource units are needed to satisfy a service request.

Program execution then enters a wait period as indicated by dotted line 218. Once the requested download has been completed, a signaling cell is received from CPE1 acknowledging the download as indicated in block 220. Thereafter, a command cell is transmitted (block 222) from the network controller 61 or 285 to the ATM switch 51 instructing the connection management software to take down the switched virtual connection between the resource address and the calling address. Finally, a billing record is created in block 223 on the basis of time, calling address, resource address, bandwidth required, the function performed and other parameters of the call. If the resource address represents a resource unit owned by a third-party, stored third party usage data may be delivered to the network controller 61 or 285, if desired, and a billing record forwarded to the Revenue Accounting Office for subscriber usage of the third-party resource unit.

Figure 7B:
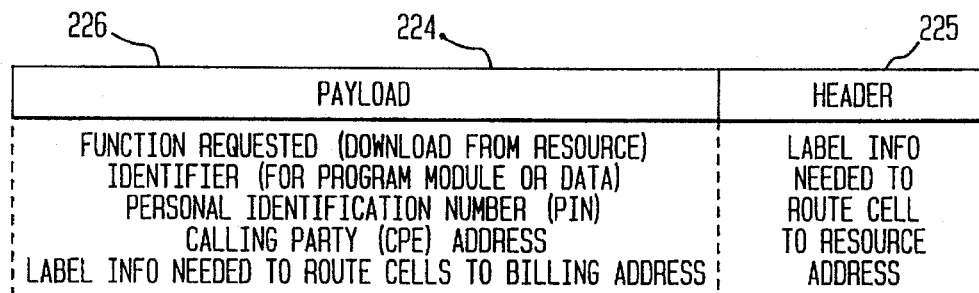
FIG. 7B graphically represents a query cell sent by the SCP or ISCP to a resource unit with the content and the CPE address for a requested network download.

A query cell 224 used to request a download from a resource unit is shown in FIG. 7B. The query cell includes a header section 225 that contains the label information needed to route the cell from the network controller 61 or 285 through the ATM switch 51 to the resource address. A payload section 226 contains information that identifies the requested download function and the program module or data and provides caller verification (PIN), calling party address and labels for cell routing to the billing address. A third party may use the BIN 50 or 280 to make direct billing charges for use of its resources, and in that event resource use charges would be separately recorded for billing by the network controller 61 or 285. Another scenario involves having the BIN-SCP notify the resource unit that a download is required to a CPE unit. The resource unit could then request that a switched virtual circuit be established to the calling party CPE.

The functional block diagrams of FIGS. 8A through 9B illustrate the operation of the BIN 50 or 280 when a service request is made for a download from a CPE unit to a BIN resource host. In block 230 of FIG. 8A, a user entry is made and received by the computing platform of a calling CPE unit that requests a download of a program module or data from the calling CPE unit to a BIN resource host.

Next, in block 231 the CPE computing platform assembles a signaling cell containing the download service request, and the signaling cell is transmitted through the BIN interface of the calling CPE to the network controller 61 or 285. After a wait period indicated by dotted line 232, a command cell is received (block 233) from the network controller with instructions to perform the download, and the download is then executed by transmitting data cells to the requested host resource unit. A signaling cell is sent to the network controller 61 or 285 when the download is completed.

Figure 8A:
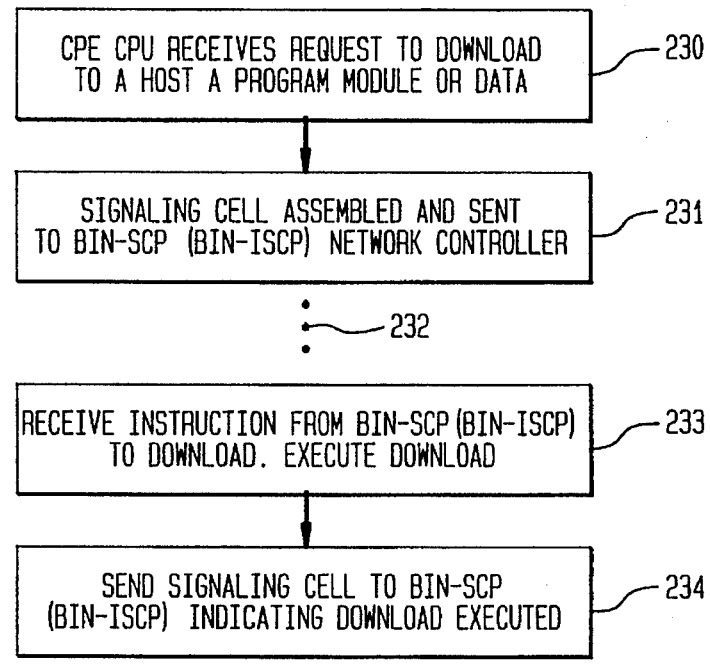
FIG. 8A is a functional block diagram representing a procedure employed in a CPE in response to a request for a CPE download to a network host unit.
Figure 8B:
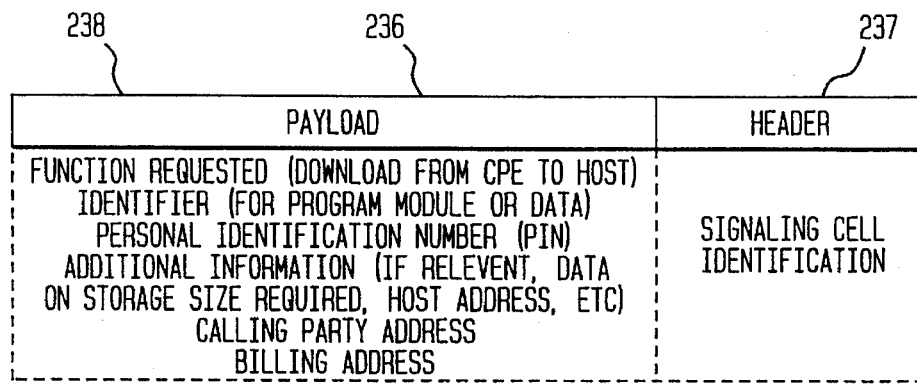
FIG. 8B graphically represents an ATM signaling cell employed to transmit a CPE request for a CPE download to a network host unit.

An ATM signaling cell 236 used for a download request from the calling CPE is graphically illustrated in FIG. 8B. A header 237 carries an identification of the cell as a signaling cell. A payload section 238 contains information requesting the download, identifying the program module or data, a PIN, needed addresses, and other data relevant to the request.

Figure 9A:
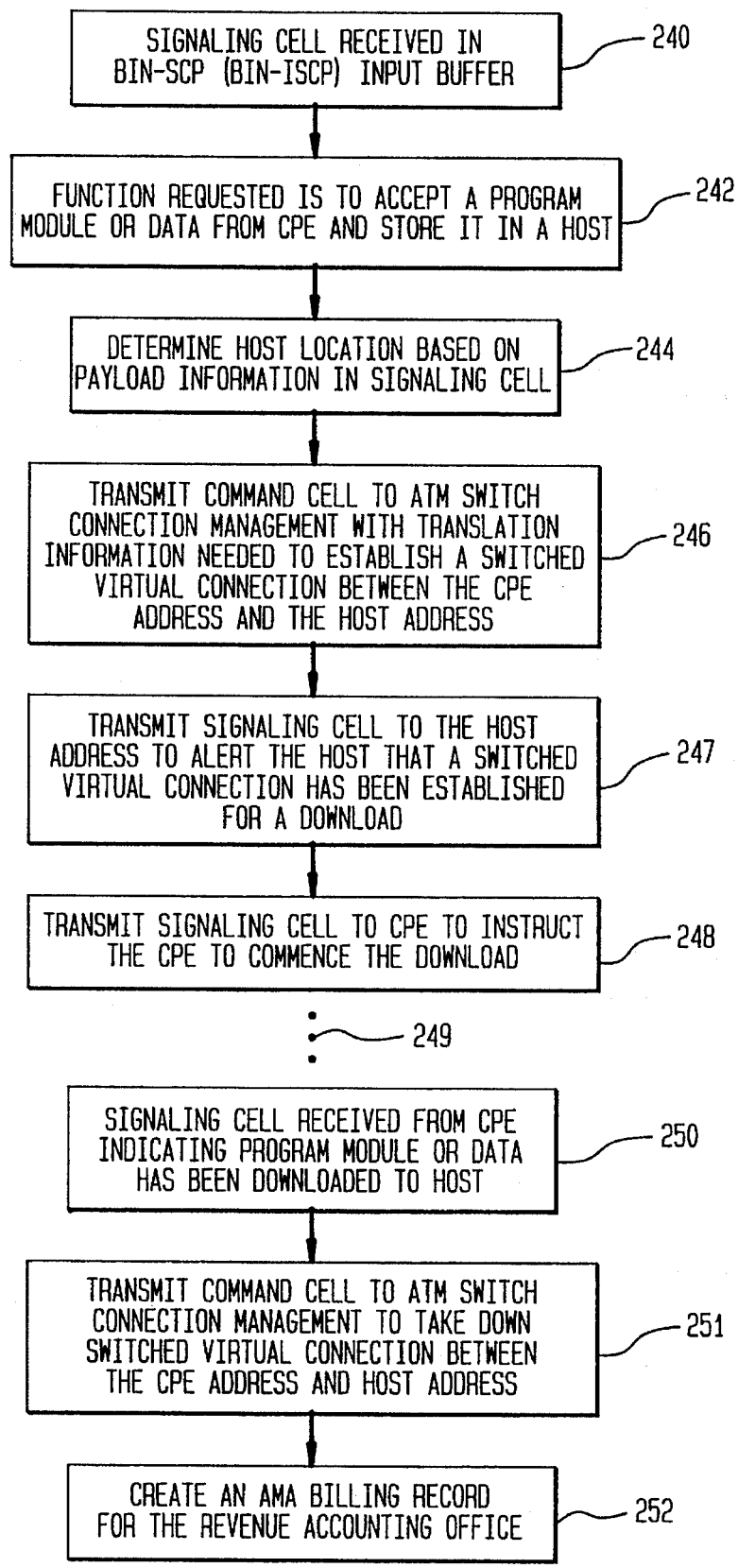
FIG. 9A illustrates a functional block diagram representing a procedure employed in the SCP or ISCP to manage a CPE request for a download from the CPE to a network host unit.

BIN processing of a CPE request for a download from the CPE is illustrated in FIG. 9A. The signaling cell making the download request is transmitted through the ATM switch 51 and received by the network controller 61 or 285 as indicated by block 240.

The requested function, i.e., download of a program module or data from the calling CPE to a resource host, is detected in block 242, and the location of the resource host is detected in block 244.

A command cell is assembled and sent (block 246) by the network controller to the ATM switch 51 to provide the connection management software with translation information needed to establish a switched virtual connection between the CPE address and the host resource address. In block 247, the network controller also assembles a signaling cell which is transmitted through the ATM switch 51 to alert the host resource that a switched virtual connection has been established for a download. The host resource unit then conditions itself to receive download transmitted from the calling CPE through the ATM switch 51.

As indicated by block 248, the network controller 61 or 285 assembles a signaling cell and transmits it through the ATM switch 51 to the calling CPE to instruct the CPE to commence the download. After a wait period indicated by dotted line 249, a signaling cell is received (block 250) by the network controller 61 or 285 from the calling CPE and through the ATM switch 51 indicating that the download to the host resource has been completed.

In block 251, the network controller 61 or 285 next assembles and transmits a disconnect command cell to the ATM switch 51. The disconnect command cell instructs the ATM connection management software to take down the switched virtual connection between the calling CPE address and the host resource address. Block 252 creates an AMA billing record of the download for the revenue accounting office on the basis of function, time, address information, etc. requested.

Figure 9B:
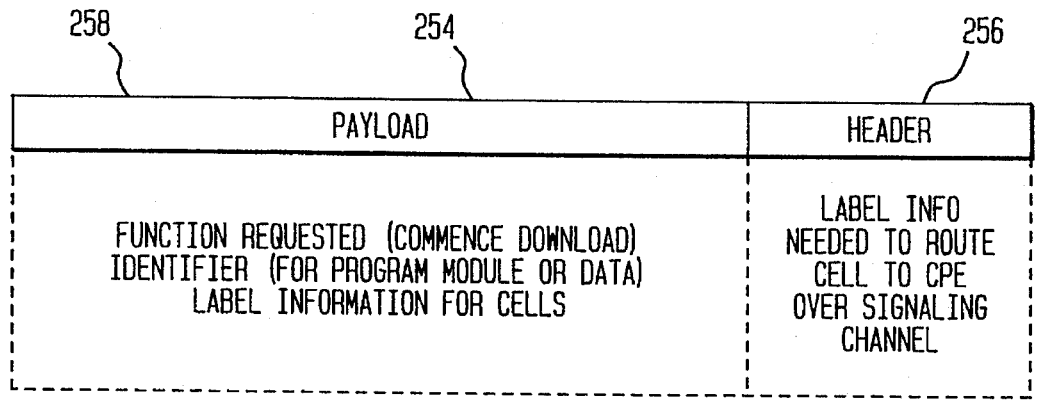
FIG. 9B graphically represents a cell transmitted from the SCP or ISCP to CPE to command execution of a requested download.

A download ATM command cell 254 is graphically illustrated in FIG. 9B. The cell 254 has a header 256 that contains label information needed to route the cell 254 through the ATM switch 51 to the calling CPE over the signaling channel. A payload section 258 contains information that identifies the requested function, i.e., a download, the program module or data to be downloaded, and label information for data cells to be assembled by the calling CPE and transmitted to the host resource unit.

Figure 10A:
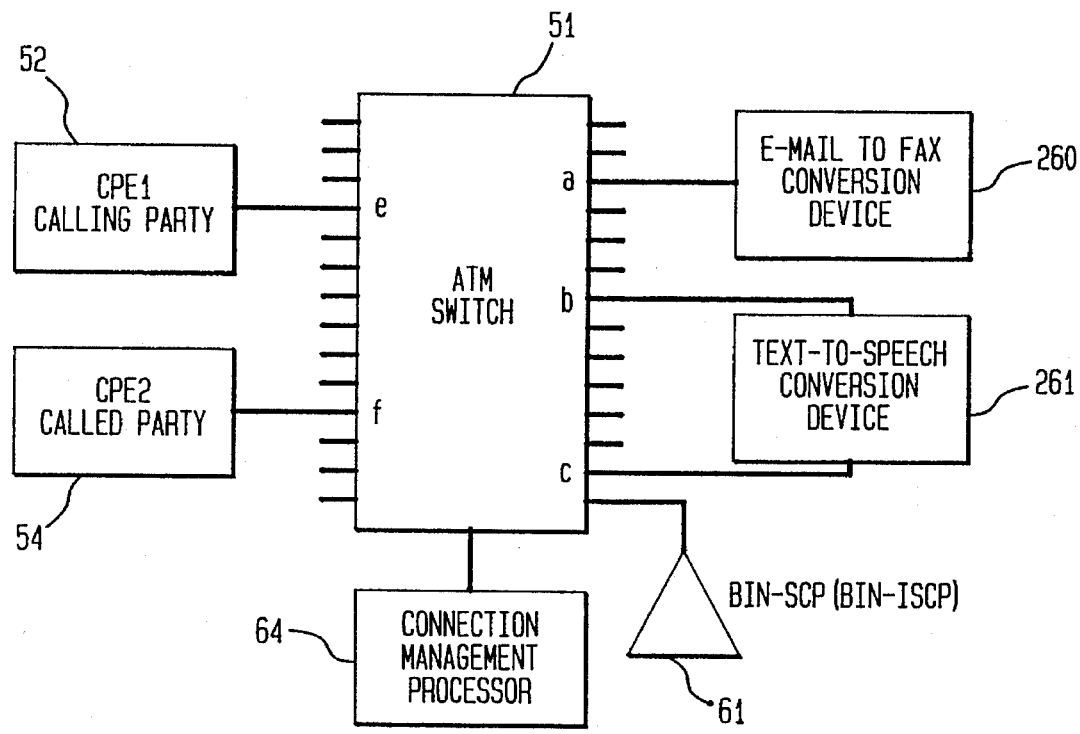
FIG. 10A shows a portion of the network of FIG. 1 or 2 with additional structure employed in providing cross-media conversion service in establishing a connection between calling and called parties.
Figure 10B:
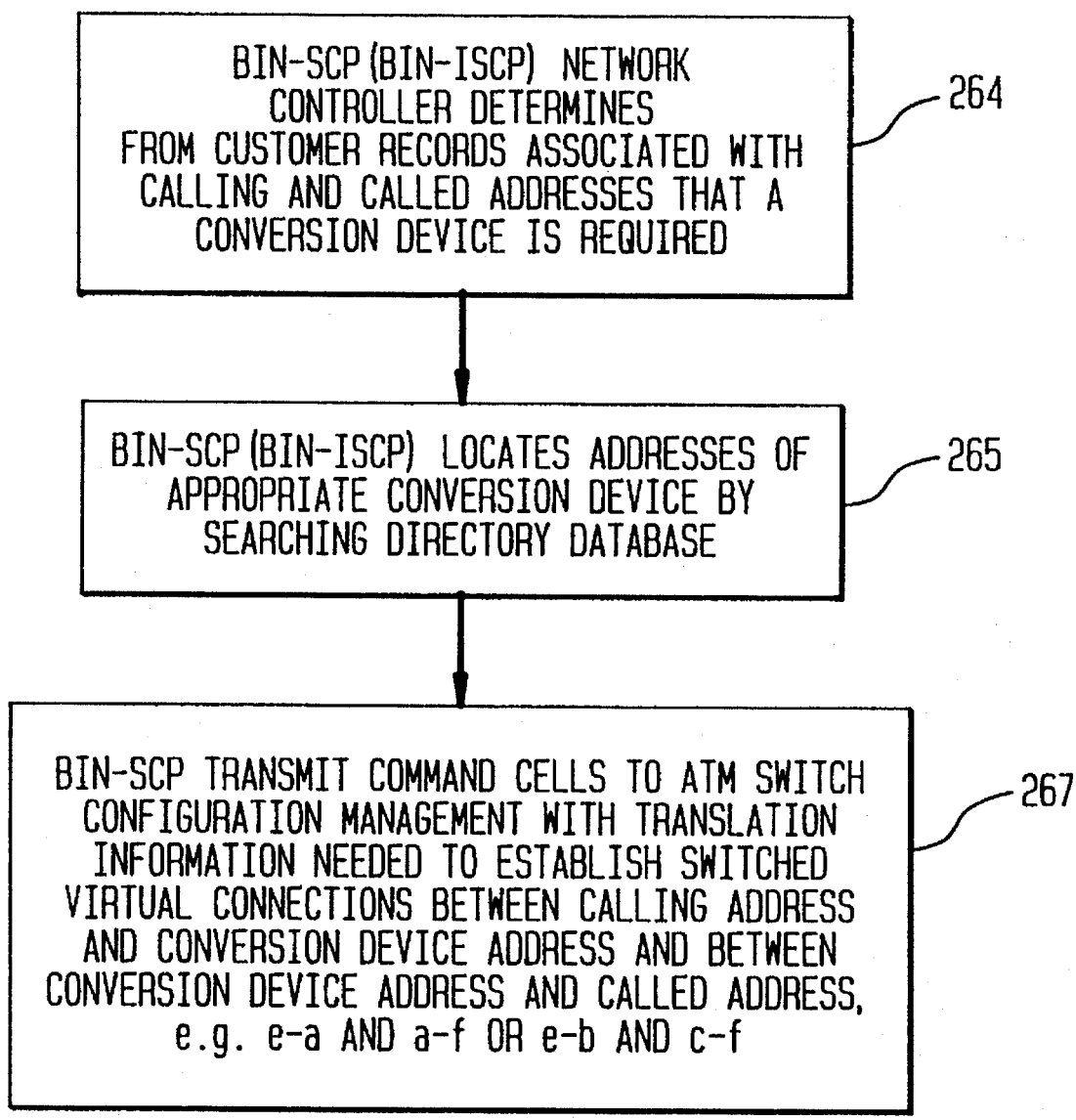
FIG. 10B is a functional block diagram representing a procedure employed in the SCP or ISCP to provide network control in establishing cross-media conversion for a call connection established in accordance with FIG. 3.

FIGS. 10A and 10B illustrate, with greater detail, the manner in which the BIN 50 or 280 operates when a converter is to be employed in the connection path between calling and called parties. An exemplary apparatus configuration within the BIN 50 or 280 is shown in FIG. 10A to illustrate employment of a server in the form of a media conversion device 260 or 261 that provides communication compatibility between the calling and called parties 52 and 54.

The device 260 is a media converter that operates to convert E-mail from the calling party 52 to a facsimile communication for delivery to the called party. The device 261 is a media converter that operates to convert E-mail sent by the calling party 52 to voice mail for delivery to the called party 54. The network controller 61 or 285 creates the necessary control signals (ATM cells) to connect the media conversion device 260 or 261 in the path between the calling and called parties 52 and 54.

As shown in FIG. 10B, the network controller 61 or 285 determines (block 264) from customer records associated with calling and called addresses that a conversion device is required in order to establish a connection for a call requested by the calling party 52. Alternatively, the calling party may request the service of a media conversion device. In block 265, the network controller 61 or 285 searches the directory database R3 (FIG. 1) to locate the address of the conversion device required or requested for a conversion service. As shown in block 267, the network controller transmits command cells to the ATM switch configuration management with translation information needed to establish switched virtual connections between the calling address and the conversion device address and between conversion device address and called address, e.g., e-a and a-f or e-b and c-1.

Figure 11A:
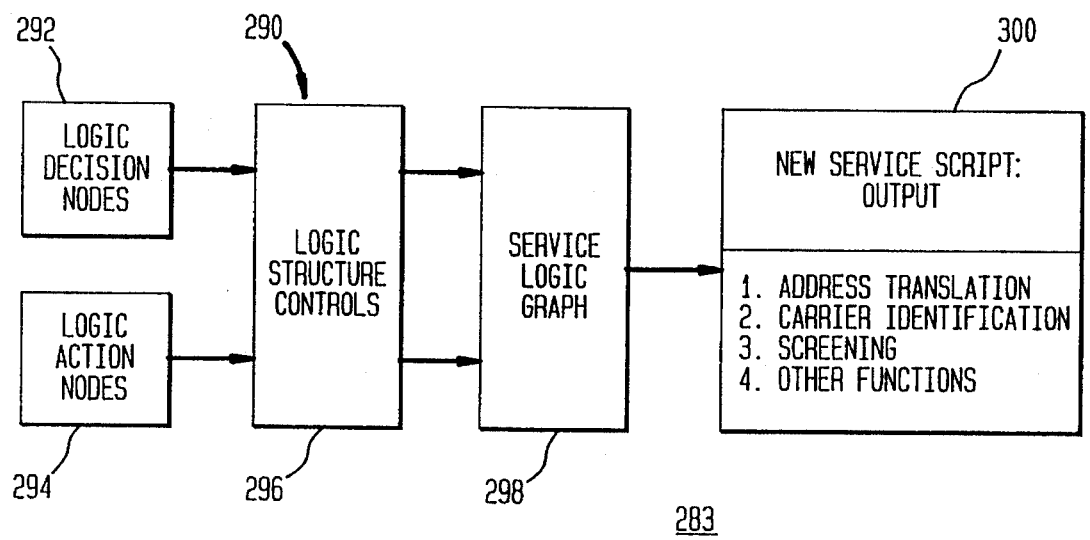
FIGS. 11A–11D are block diagrams that illustrate the manner in which a network service creation program is downloaded to CPE for customer creation of a new service script and subsequent installation in the BIN in accordance with the invention.

The SPACE® system 283 (FIG. 2) includes a SPACE® service creation program 290 which has a basic configuration as shown in FIG. 11A. A more detailed description of the SPACE® service program 290 is set forth in the following copending applications assigned to the present assignee and are hereby incorporated by reference: 1) U.S. Patent Application Ser. No. 07/629,371, now U.S. Pat. No. 5,241,588, entitled "Systems and Processes Providing Programmable or Customized Customer Telephone Information Services," by Ely et al., filed Dec. 18, 1990; 2) U.S. Patent Application Ser. No. 07/972,817, now U.S. Pat. No. 5,450,480 entitled "A Method of Creating a Telecommunication Service Specification" by Man et al., filed Nov. 6, 1992; and 3) U.S. Patent Application Ser. No. 07/934,240, abandoned entitled "System and Method for Creating, Transferring, and Monitoring Services in a Telecommunication System", by Nazif et al, filed Aug. 25, 1992.

The service creation program 290 (FIG. 11A) employs a plurality of predetermined logic decision nodes 292 and a predetermined plurality of logic action nodes 294. Logic structure controls 296 are directed by user keyboard or other inputs to stitch selected decision nodes 292 and selected action nodes 294 together to form a service logic graph 298 that represents a network service to be executed by the BIN 280.

A new service script output 300 is thus made available for installation in the BIN-ISCP 285. As shown in the service script output block 300, a new service script may be designed to provide network functions for a user, including address translation, carrier identification, screening and other functions.

Figure 11B:
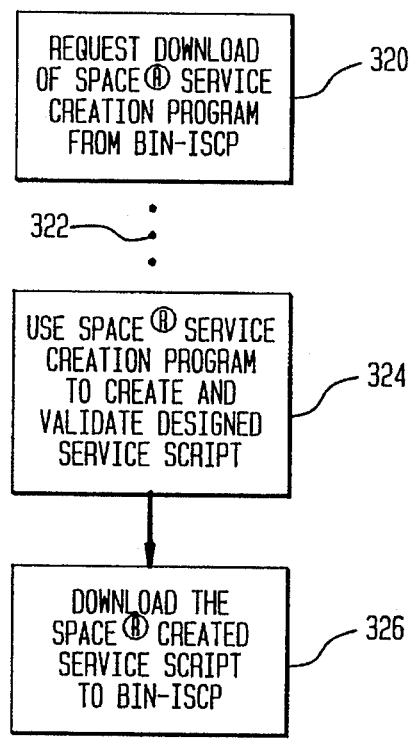
Figure 11C:
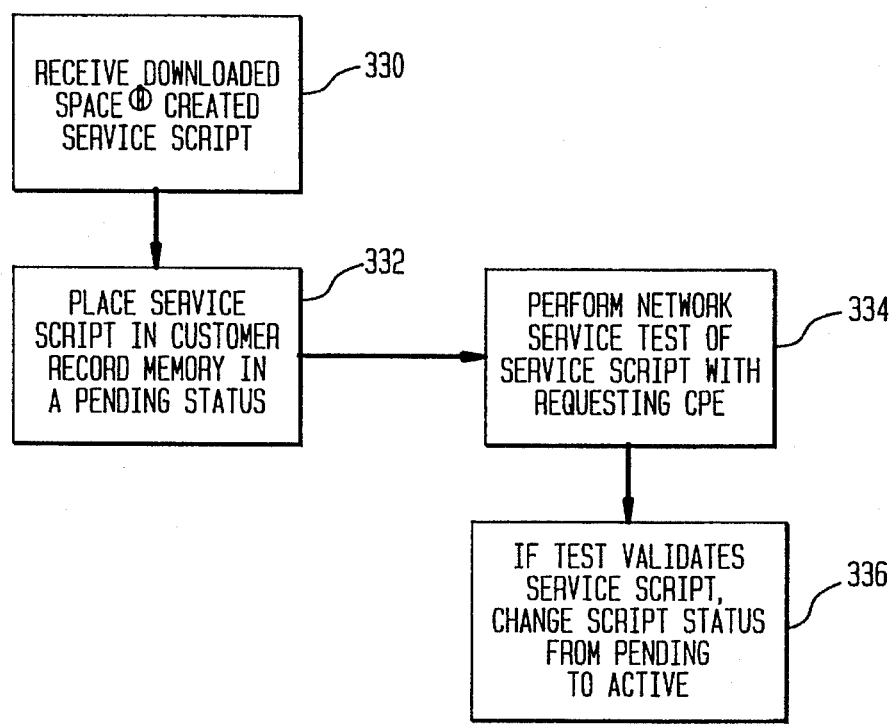
Figure 11D:
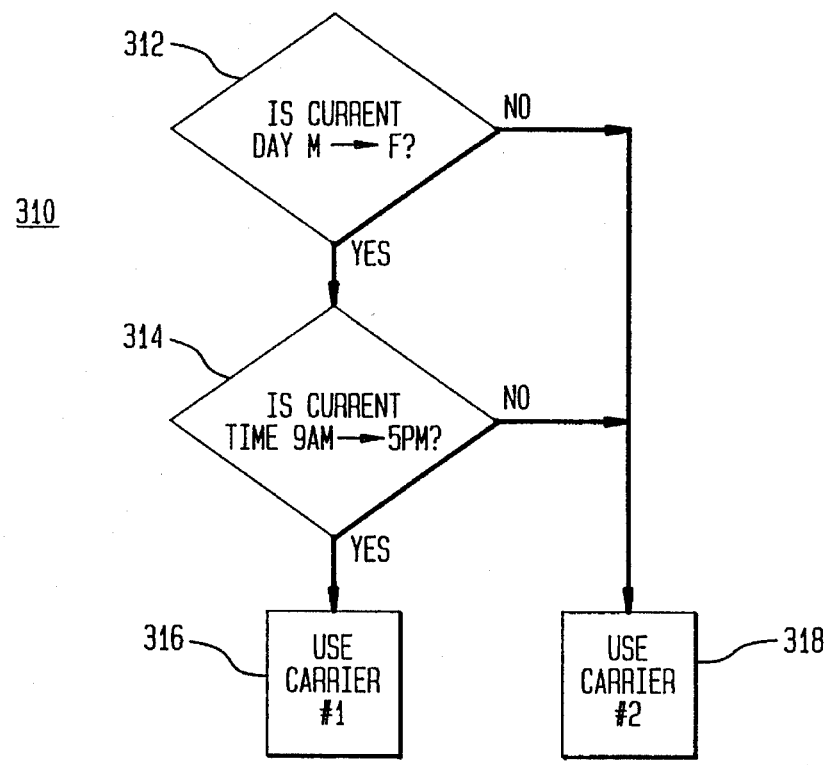

An illustrative output script is shown in FIG. 11D in the form of a service procedure 310 designed to provide a special schedule for interexchange carrier selections for a particular CPE unit. In response to a call placed from the CPE unit, a first decision node 312 determines whether the current day is Monday through Friday. The node 312 is stitched to another decision node 314 that determines whether the current time is between 9 AM and 5 PM.

An action node 316 is stitched to the decision node 314 to select interexchange carrier #1 for the call if affirmative decisions are made in the decision nodes 312 and 314, i.e., if it is between 9 AM and 5 PM on Monday through Friday. Similarly, an action node 318 is stitched to the decision nodes 312 and 314 to select interexchange carrier #2 for the call at all other times.

In accordance with the present invention, the SPACE® service creation program is downloaded from the BIN-ISCP 285 (or, if desired from a predetermined resource unit) to a CPE unit on request as described in connection with FIGS. 6A through 7B. The CPE request for a download of the SPACE® service creation program is indicated by block 320 in FIG. 11B. The CPE then waits as indicated by dotted line 322. The BIN-ISCP 285 responds to the request by determining from stored customer records a version of the requested program compatible with the application program interface of the CPE and then controls a download of the selected program version.

After the CPE receives the downloaded SPACE® service creation program, the program can be used to create a desired service script as indicated by block 324. The new service script can then be validated, using an expert system which is part of the SPACE® program, before being made available for output. A request is then made to download the new service script from the CPE to the BIN-ISCP 285 as indicated by block 326. The requested download is performed as described in connection with FIGS. 8A–9B.

The BIN-ISCP 285 receives the downloaded service script as indicated by block 330 in FIG. 11C. As shown in block 332, the service script is placed in a pending status in the applicable customer record in a memory system (not shown) employed by the BIN-ISCP 285. The BIN-ISCP 285 next tests the operation of the service script with the requesting CPE unit as shown in block 334.

If the service script is validated by the test in block 336, the service script status can be changed from pending to active in the memory system and a new network service, created by the customer at the site of the customer CPE unit, is thus installed in the BIN-ISCP 280 and available for use by the customer on request. The present invention accordingly facilitates the provision of customer services by enabling automatic customization of the BIN-ISCP 285 by the customer from the customer site to meet specific customer service needs.

In accordance with a related aspect of the invention, an existing script can be downloaded from the BIN-ISCP 285 to a CPE unit so that the customer can inspect to determine or verify its content or to use it as a starting point to create a modified script in a manner similar to that just described.

Figure 12A:
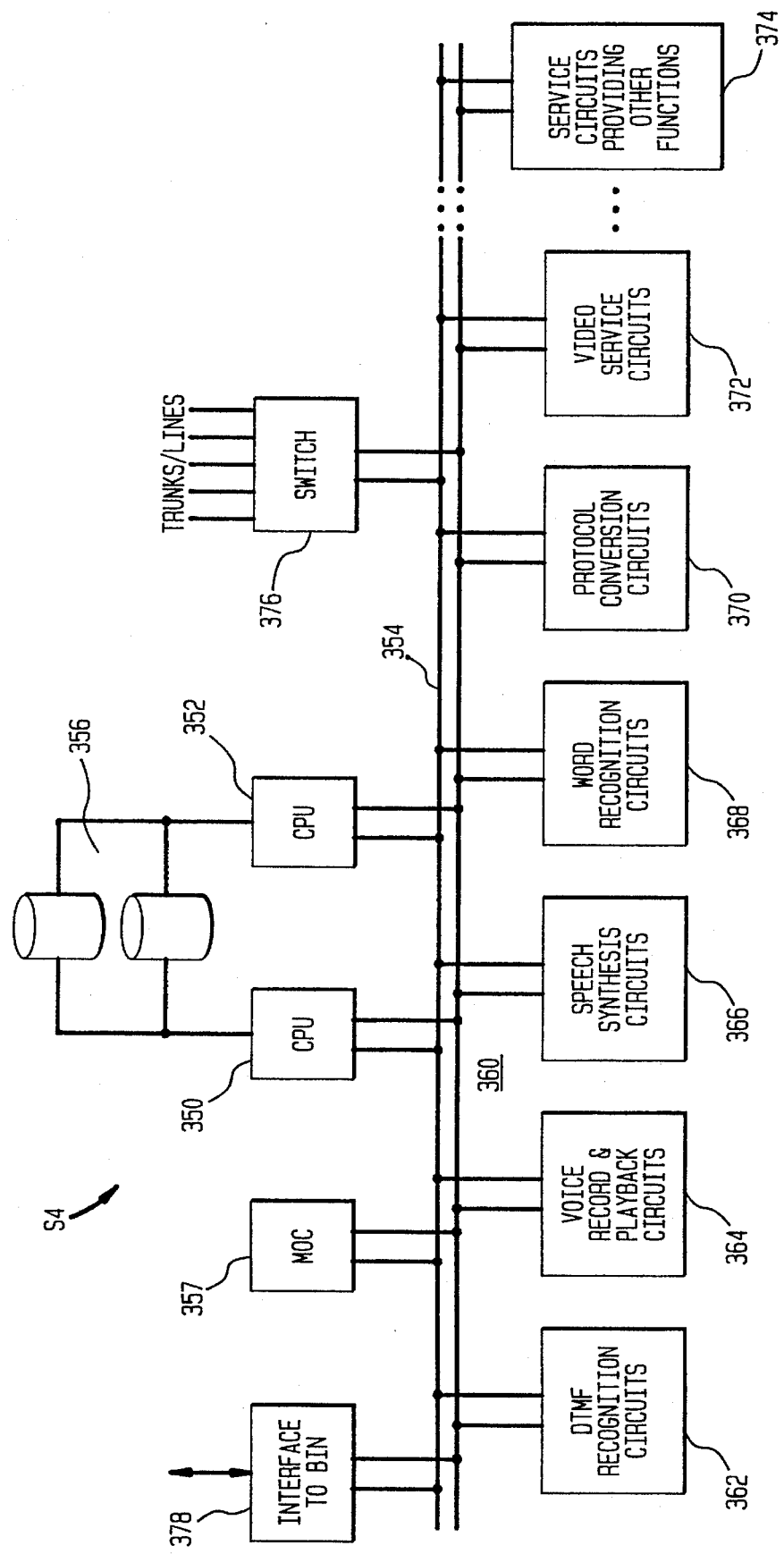
FIGS. 12A–12C are block diagrams that illustrate the manner in which an intelligent services peripheral is operated by the BIN to provide requested services to CPE units in accordance with the invention.

The BIN-ISP S4 of FIG. 1 or 2 is shown in greater block detail in FIG. 12A. The ISP S4 has a CPU 350 and a backup CPU 352 connected to a duplicated bus 354 and a memory system 356. A Maintenance and Operations Console (MOC) 357 provides a human interface to the ISP to facilitate monitoring and controlling the system.

A library 360 of service circuits includes units categorized as follows: DTMF recognition circuits 362, voice record and playback circuits 364, speech synthesis circuits 366, word recognition circuits 368, protocol conversion circuits 370, video service circuits 372 and service circuits providing other functions as indicated by the reference character 374. It is noted that conversion services may be provided by separate converters such as converters S1–S3 of FIG. 1 or by corresponding service circuits that may be included in the ISP service circuit library 360.

For example, the ISP functions may support a service that provides automatic customer-name-and-address (ACNA). The ACNA service is requested by dialing the ISP followed by key entry of the applicable service code and the directory number of a party for whom the name and address is desired. The ISP 54 responds by announcing the requested name and address through a speech synthesis unit.

In this case, the ISP bus 354 is interfaced to a switch 376 in the circuit-switched network. Interface circuitry 378 connects the ISP bus 354 to the BIN 50 or 280. Thus, ISP service circuits are economically employed for service in both the circuit-switched network and in the BIN 50 or 280. Alternatively, the ISP S4 may be connected for use only with the BIN 50 or 280. In that event, the interface to the switch 376 is omitted.

Figure 12B:
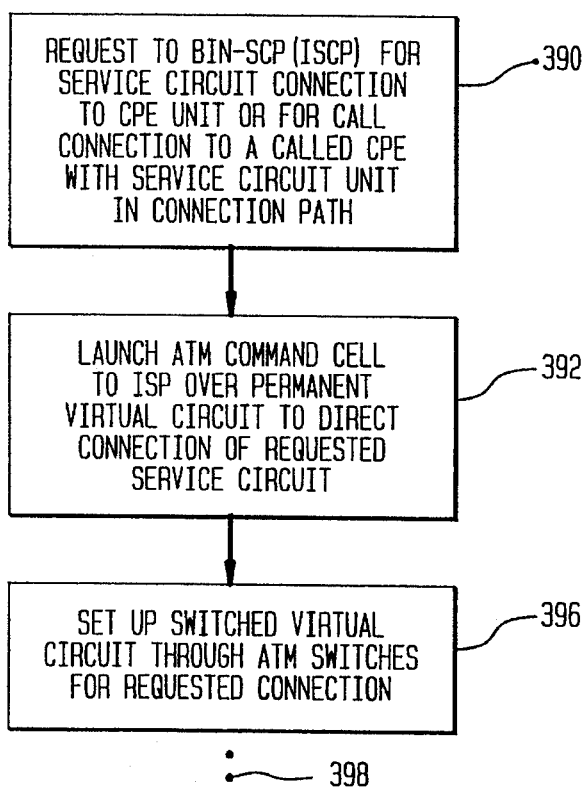

FIG. 12B illustrates the operation of the network controller 61 or 285 in responding to a request for a server or service circuit connection. In block 390, the network controller 61 or 285 receives a request for a service circuit connection to a CPE unit or for a call connection to a called CPE unit with a converter or service circuit in the connection path.

As indicated by block 392, the network controller 61 or 285 launches an ATM command cell to the ISP S4 through a permanent virtual circuit in the ATM switch 51. The command cell has a payload section containing information that directs the ISP to connect the requested service circuit. As indicated in block 396, the network controller 61 or 285 then sets up a switched virtual circuit(s) through the ATM switch 51 for the requested connection.

Dotted line 398 indicates a wait period until the requested service circuit has been connected for use, and a request has been returned for termination of the service circuit connection. Block 400 then executes the disconnect.

Figure 12C:
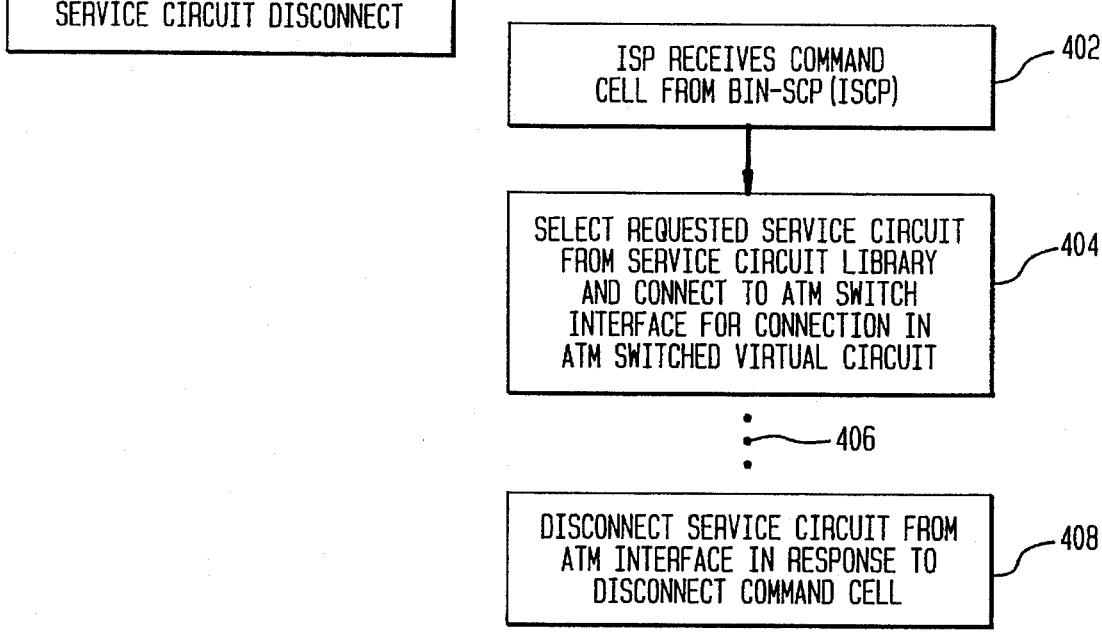

As shown in FIG. 12C, the ISP S4 receives the command cell from the network controller 61 or 285 as indicated by block 402. In block 404, the ISP S4 selects the requested service circuit from the service circuit library 360, and connects the selected service circuit to the ATM interface 378 for connection in the ATM switched virtual circuit established by the network controller 61 or 285.

After a wait period, indicated by reference character 406, the ISP S4 disconnects the service circuit from the ATM interface circuitry 378 in response to the disconnect command cell from the network controller 61 or 285.

The foregoing description of the preferred embodiment has been presented to illustrate the invention. It is not intended to be exhaustive or to limit the invention to the form disclosed. In applying the invention, modifications and variations can be made by those skilled in the pertaining art without departing from the scope and spirit of the invention. It is intended that the scope of the invention be defined by the claims appended hereto, and their equivalents.

What is claimed is:

1. A broadband intelligent network comprising:

a fast-packet switch having a plurality of ports;

a switch processor to establish switched virtual connections or permanent virtual connections between ports;

respective customer links having a broad digital bandwidth connected to predetermined customer switch ports for transporting signaling and data cells to and from respective customer premises equipment (CPE) units;

a network control processing system interfaced to at least one switch port to receive signaling cells generated by CPE units and carrying customer service request data, and to control network responses thereto;

a resource system for the network having at least one resource unit interfaced to a resource unit port of the fast-packet switch to receive query cells and to transmit response cells carrying resource data;

the switch processor detecting each customer generated signaling cell generated by a CPE unit and received by the switch and routing each generated signaling cell through a first virtual circuit and the one switch port to the network control processing system;

the network control processing system detecting service request data in each signaling cell requesting download of a program module or data from the network to a CPE unit from which the service request data is received or from the requesting CPE unit to the network;

the network control processing system responding to download requests by effecting the requested download between the requesting CPE unit and the network through the fast-packet switch; and the network control processing system directing the switch processor to establish a second virtual circuit in the fast-packet switch between the requesting CPE unit and the resource unit if a host or other resource unit connection is required by the service request.

2. The broadband intelligent network of claim 1 wherein a service request represented by the service request data is a download request for one of the program modules and the data from the network to the requesting CPE unit and wherein the one program module or the data is downloaded from its storage location through the first associated virtual circuit in the fast-packet switch from the network control processing system or through the second virtual circuit in the fast-packet switch from the resource unit to the requesting CPE unit.

3. The broadband intelligent network of claim 1 wherein a service request represented by the service request data is a request for a download of one of the program modules and the data from the requesting CPE unit to the network and wherein one of the program modules and the data is downloaded through the first one of a associated virtual-circuit in the fast-packet switch from the requesting CPE unit to the network control processing system and a second associated virtual circuit in the fast-packet switch from the requesting CPE to the resource unit according to the service request.

4. The broadband intelligent network of claim 2 wherein:

the service request is for the program module or the data from the resource units;

the network control processing system routes a query cell to the resource unit through the fast-packet switch requesting information from the resource unit to support the requested service; and the resource unit transmits a response cell carrying the requested information to the requesting CPE.

5. The broadband intelligent network of claim 2 wherein:

the program modules is for a computer program module; and the resource unit is a computer program library from which the computer program module is downloaded to the requesting CPE unit.

6. The broadband intelligent network of claim 2 wherein:

the program module is for a video program; and the resource unit is a video program library from which the requested video program is downloaded to the requesting CPE unit.

7. The broadband intelligent network of claim 1 wherein the requested program module or data is one of being resident in and or is to be hosted in the network control processing system; and the network control processing system directs download for the requesting CPE unit through the first associated virtual circuit of the fast-packet switch.

8. The broadband intelligent network of claim 7 wherein the service request is for a download from the network and the program module is a service creation program module; and the network control processing system downloads the service creation program module to the requesting CPE unit from a network storage location through one of the first and second associated virtual circuits of the fast-packet switch.

9. A broadband intelligent network comprising:

a fast-packet switch having a plurality of ports;

a switch processor to establish switched virtual connections or permanent virtual connections between ports;

respective customer links having a broad digital bandwidth connected to predetermined customer switch ports for transporting signaling and data cells to and from respective customer premises equipment (CPE) units;

a network control processing system interfaced to at least one switch port to receive customer generated signaling cells carrying customer service request data and to control network responses thereto;

the switch processor detecting each customer generated signaling cell received by the switch and routing each customer generated signaling cell through a first associated virtual circuit to the network control processing system through the one switch port;

the network control processing system detecting service request data in each received signaling cell from a requesting CPE unit requesting download of a service creation program module from the network; and the network control processing system downloading the service creation program module to the requesting CPE unit through one of the first virtual circuit of the fast-packet switch and a second virtual circuit for downloading the service creation program from a separate storage unit.

10. The broadband intelligent network of claim 9 wherein:

respective CPE units are interfaced with the respective customer links.

11. The broadband intelligent network of claim 10 wherein:

the requested service creation program module is executed by the requesting CPE unit to create a new service script after the download is completed.

12. The broadband intelligent network of claim 11 wherein:

the requesting CPE unit generates a download request for the new service script in a script-download signaling cell sent through the first associated virtual circuit of the fast-packet switch to the network control processing system; and the network control processing system receives the new service script and installs the new service script as an active service in a customer record.

13. The broadband intelligent network of claim 12 wherein:

the network control processing system receives the new service script as a pending service, tests the pending service with the requesting CPE unit, and installs the new service script in the customer record as an active service if the new service script is validated by the test.

14. The broadband intelligent network of claim 11 wherein:

a version of the service creation program module compatible with an application program interface of the requesting CPE unit is downloaded to the requesting CPE; and upon CPE request the network control processing system transmits a signaling cell through the fast-packet switch for the requesting CPE unit to download the new service script to the network control processing system.

15. The broadband intelligent network of claim 1 wherein the fast-packet switch is an ATM switch.

16. The broadband intelligent network of claim 4 wherein the fast-packet switch is an ATM switch.

17. The broadband intelligent network of claim 9 wherein the fast-packet switch is an ATM switch.

18. The broadband intelligent network of claim 1 wherein:

a system of server devices and service circuits is provided with respective connections to server ports of the fast-packet switch for connection to calling parties or for connection in a connection path between calling and called parties; and the network control processing system detects a need for the services of at least one of a server device and a service circuit and establishes virtual circuitry for a CPE unit through the fast-packet switch to one of the server devices and circuits in accordance with the service need.

19. A broadband intelligent network comprising:

a fast-packet switch having a plurality of ports;

a switch processor to establish switched virtual connections or permanent virtual connections between ports;

respective customer links having a relatively broad digital bandwidth connected to predetermined customer switch ports for transporting signaling and data cells to and from respective customer premises equipment (CPE) units;

a network control processing system interfaced to at least one switch port to receive signaling cells generated by CPE units and carrying customer service request data, and to control network responses thereto;

the switch processor detecting each signaling cell generated by a requesting CPE unit and received by the switch and routing each such signaling cell through a first associated virtual circuit to the network control processing system through the one switch port;

a system of server devices and circuits provided with respective connections to server ports of the fast-packet switch for one of a connection to a calling party and a connection between calling and called parties; and the network control processing system detecting a need for the services of one of a server device and a service circuit and establishing virtual circuitry for at least a CPE unit of a calling party through the fast-packet switch to at least one of a server device and a service circuit in accordance with the service need.

20. The broadband intelligent network of claim 19 wherein:

the server system includes a system library of service circuits having a network interface circuit; and the network control processing system transmits a command cell to the system library to direct connection of the requested service circuit to the network interface circuit.

21. The broadband intelligent network of claim 20 wherein the system library is an intelligent services peripheral (ISP) having an additional interface circuit for operation of the (ISP) in a circuit-switched network.

22. The broadband intelligent network of claim 19 wherein the server system includes a converter device for series connection in a call connection path between calling and called parties; and the network control processing system transmits a command cell to the converter device to provide conversion service in the call connection path between calling and called parties.

23. The broadband intelligent network of claim 22 wherein the converter device is a media converter for converting communication signals from one medium to a second medium.

24. The broadband intelligent network of claim 22 wherein the converter device is a protocol converter.

25. The broadband intelligent network of claim 22 wherein the converter device is a speed converter for converting communication signals transmitted at one rate to communication signals transmitted at a second rate.

26. The broadband intelligent network of claim 20 wherein the system library includes at least one converter circuit for connection to the network interface circuit to provide a requested service.

27. A broadband intelligent network comprising:

a fast-packet switch having a plurality of ports;

a switch processor to establish switched virtual connections or permanent virtual connections between ports;

respective customer links having a broad digital bandwidth connected to predetermined customer switch ports for transporting signaling and data cells to and from respective customer premises equipment (CPE) units;

a network control processing system interfaced to at least one switch port to receive signaling cells generated by CPE units and carrying customer service request data, and to control network responses thereto;

the switch processor detecting each signaling cell generated by a requesting CPE unit received by the switch and routing each such signaling cell through a first associated virtual circuit to the network control processing system through the one switch port;

an intelligent services peripheral (ISP) having a library of service circuits;

a first interface circuit for coupling the ISP to a circuit-switched network to enable the service circuits to provide service thereto on request;

a second interface circuit for coupling the ISP to ISP ports of the fast-packet switch for one of a connection to a calling party and a connection between calling and called parties in the broadband intelligent network; and the network control processing system detecting a need for service from a service circuit in the ISP and directing the ISP to connect a service circuit to the second interface circuit and to establish a virtual circuit for a CPE unit through the fast-packet switch in accordance with the service need.

28. The broadband intelligent network of claim 19 wherein:

the network control processing system detects service request data in each signaling cell requesting a message broadcast;

the network control processing system directs the switch processor to establish additional virtual circuits through the fast-packet switch between the requesting CPE unit and a designated list of addresses; and at least one of the additional virtual circuits includes a connection through a server circuit.

29. A broadband intelligent network comprising:

a fast-packet switch having a plurality of ports;

a switch processor to establish switched virtual or permanent virtual connections between ports;

respective customer links having a relatively broad digital bandwidth connected to predetermined customer switch ports for transporting signaling and data cells to and from respective customer premises equipment (CPE) units;

a network control processing system interfaced to at least one switch port to receive signaling cells, generated by CPE units and carrying customer service request data, and to control network responses thereto;

the switch processor detecting each signaling cell generated by a CPE unit and received by the fast-packet switch and routing each such signaling cell through a first associated virtual circuit to the network control processing system through the one switch port;

the network control processing system detecting service request data in each signaling cell requesting a message broadcast; and the network control processing system directing the switch processor to establish additional virtual circuits through the fast-packet switch between a requesting CPE from which the service request is received and a designated list of addresses for each message broadcast.

30. A method for operating a broadband intelligent network having a fast-packet switch with a plurality of ports, a switch processor to establish switched virtual or permanent virtual connections between ports, respective customer links having a broad digital bandwidth connected to predetermined customer switch ports for transporting signaling and data cells to and from respective customer premises equipment (CPE) units, a network control processing system interfaced to at least one switch port to receive signaling cells, generated by CPE units and carrying customer service request data, and to control network responses thereto, and a resource system for the network having at least one resource unit interfaced to a resource unit port of the fast-packet switch to receive query cells and to transmit response cells, the steps of the method comprising:

detecting each signaling cell generated by a requesting CPE unit and received by the switch processor;

routing each customer generated signaling cell through a first associated virtual circuit and the one switch port to the network control processing system;

detecting service request data in each signaling cell requesting download of one of a program module and data from the network to a requesting CPE unit from which the service request data is received or from the requesting CPE unit to the network;

downloading requested downloads between the requesting CPE unit and the network through the fast-packet switch; and directing the switch processor to establish a second associated virtual circuit in the fast-packet switch between the requesting CPE unit and the resource unit if a host or other resource unit connection is required by the service request.

31. The method of claim 30 wherein the service request is a request for a download from the network to the requesting CPE unit and wherein the method steps further comprise downloading one of the program module and the data through the associated virtual circuit in the fast-packet switch from one of the network control processing system and the resource unit to the requesting CPE unit.

32. The method of claim 30 wherein the service request is a request for a download from the requesting CPE unit to the network and wherein the method steps further comprise downloading one of the program module and the data through an associated virtual circuit in the fast-packet switch from the requesting CPE unit to the network control processing system or the resource unit.

33. The method of claim 31 wherein the service request is for the program module or the data and wherein the method further comprises the steps of:

routing a query cell to the source resource unit through the fast-packet switch requesting information needed from the resource unit to support the requested service; and transmitting a response cell from the resource unit carrying the requested information to the requesting CPE unit.

34. The method of claim 30 wherein the requested one of the program module and the data is resident to be hosted in the network control processing system; and wherein the method further comprises the step of:

directing the requesting CPE for a download through the first or second associated virtual circuit of the fast-packet switch.

35. The method of claim 34 wherein the service request is for a download from the network and the program module is a service creation program module; and wherein the method further comprises the step of:

operating the network control processing system to download the service creation program module to the requesting CPE unit through the associated virtual circuit of the fast-packet switch.

36. A method for operating a broadband intelligent network having a fast-packet switch with a plurality of ports, a switch processor to establish switched virtual connections or permanent virtual connections between ports, respective customer links having a broad digital bandwidth connected to predetermined customer switch ports for transporting signaling and data cells to and from respective customer premises equipment (CPE) units, and a network control processing system interfaced to at least one switch port to receive signaling cells, generated by CPE units and carrying customer service request data, and to control network responses thereto, the steps of the method comprising:

detecting each signaling cell generated by a CPE unit and received by the switch to route each such signaling cell through a first associated virtual circuit and the one switch port to the network control processing system;

detecting service request data in a received signaling cell requesting download of a service creation program module from the network;

directing the switch processor to establish a second associated virtual circuit in the fast-packet switch between the requesting CPE unit and one of a host resource unit and a source resource unit if a host or other resource unit connection is required by the service request; and downloading the service creation program module to the requesting CPE unit through the associated virtual circuit of the fast-packet switch.

37. The method of claim 36 wherein:

respective CPE units are interfaced with the respective customer links and wherein the steps further comprise:

executing the requested service creation program module in the requesting CPE unit to create a new service script after the download is completed;

generating a download request for the new service script in a script-download signaling cell sent through the first associated virtual circuit of the fast-packet switch to the network control processing system; and receiving the new service script in the network control processing system and installing the new service script as an active service in a customer record.

38. A method for operating a broadband intelligent network having a fast-packet switch with a plurality of ports, a switch processor to establish switched virtual connections or permanent virtual connections between ports, respective customer links having a broad digital bandwidth connected to predetermined customer switch ports for transporting signaling and data cells to and from respective customer premises equipment (CPE) units, a network control processing system interfaced to at least one switch port to receive signaling cells generated by CPE units and carrying customer service request data, and to control network responses thereto, and a system of server devices and service circuits provided with respective connections to server ports of the fast-packet switch for one of a connection to a calling party and a connection between calling and called parties, the steps of the method comprising:

detecting each signaling cell, generated by a CPE unit and received by the switch, and routing each such signaling cell through a first associated virtual circuit and the one switch port to the network control processing system; and detecting a need for the services of one of a server device and a service circuit and establishing virtual circuitry for a CPE unit through the fast-packet switch to one of the server devices and the service circuits in accordance with the service need.

39. The method of claim 38 wherein the server system includes a system library of service circuits having a network interface circuit, and wherein the steps further comprise:

transmitting a command cell to the system library to direct connection of the requested service circuit to the network interface circuit.

40. The method of claim 38 wherein the server system includes a converter device for series connection in a call connection path between calling and called parties, and wherein the method further comprises:

transmitting a command cell to the converter device to provide conversion service in a requested call connection path between calling and called parties.

41. A method for operating a broadband intelligent network having a fast-packet switch with a plurality of ports, a switch processor to establish switched virtual connections or permanent virtual connections between ports, respective customer links having a broad digital bandwidth connected to predetermined customer switch ports for transporting signaling and data cells to and from respective customer premises equipment (CPE) units, a network control processing system interfaced to at least one switch port to receive signaling cells generated by CPE units and carrying customer service request data, and to control network responses thereto, an intelligent services peripheral (ISP) having a library of service circuits, an interface circuit for coupling, under ISP control, service circuits of the ISP to ISP ports of the fast-packet switch for connection in a path to a calling party or between calling and called parties in the broadband intelligent network, the steps of the method comprising:

detecting each signaling cell, generated by a CPE unit and received by the switch, and routing each such signaling cell through a first associated virtual circuit and the one switch port to the network control processing system; and detecting a need for service for one of the CPE units from a requested service circuit in the ISP and directing the ISP to connect a requested service circuit to the interface circuit; and establishing a virtual circuit for the one CPE unit through the fast-packet switch to the requested service circuit in accordance with the service need.

42. A method for operating a broadband intelligent network having a fast-packet switch with a plurality of ports, a switch processor to establish switched virtual connections or permanent virtual connections between ports, respective customer links having a broad digital bandwidth connected to predetermined customer switch ports for transporting signaling and data cells to and from respective customer premises equipment (CPE) units, a network control processing system interfaced to at least one switch port to receive customer generated signaling cells carrying customer service request data and to control network responses thereto, the steps of the method comprising:

detecting each signaling cell, generated by a CPE unit and received by the switch and routing each such signaling cell through a first associated virtual circuit and the one switch port to the network control processing system;

detecting service request data in a signaling cell requesting a message broadcast; and directing the switch processor to establish additional virtual circuits through the fast-packet switch between the requesting CPE unit and a designated list of addresses for each message broadcast.

43. The broadband intelligent network of claim 1, wherein:

the network control processing system generates billing data based on network use by CPE units for formatting into customer billing statements; and the billing data includes charges for network connections, charges for usage of resource units owned by the network, and third party charges including charges for usage of resource units owned by one or more third parties.

44. The broadband intelligent network of claim 43 wherein the network control processing system further directly transmits the billing data in a predetermined format through the fast-packet switch to the corresponding CPE unit(s).

45. The broadband intelligent network of claim 9 wherein:

the network control processing system generates billing data based on network use by CPE units for formatting into customer billing statements; and the billing data includes charges for network connections, charges for usage of resource units owned by the networks, including charges for downloading and usage of the service creation program module, and third party charges including charges for usage of resource units owned by one or more third parties.

46. The broadband intelligent network of claim 18, wherein:

the network control processing system generates billing data based on network use by CPE units for formatting into customer billing statements;

the billing data including charges for network connections, charges for usage of resource units owned by the network, charges for usage of server devices or service circuits, and third party charges including charges for usage of resource units owned by one or more third parties.

47. The method of claim 30 further including the steps of:

generating billing data based on network use by CPE units for formatting into customer billing statements; and the billing data including charges for network connections, charges for usage of resource units owned by the networks, and third party charges including charges for usage of resource units owned by one or more third parties.

48. The method of claim 47 further comprising the step of directly transmitting the billing data from the network control processing system in a predetermined format through the fast-packet switch to the corresponding CPE unit(s).

49. The method of claim 36 further including the steps
generating billing data based on network use by CPE units for formatting into customer billing statements; and
including charges for network connections and charges for downloading and usage of the service creation program module in the billing data.

50. The broadband intelligent network of claim 22 wherein the converter device is a video transcoder for converting video signals from one encoding scheme to another encoding scheme.

51. The broadband intelligent network of claim 2 wherein:
the resource unit receives a query cell through the fast-packet switch from the network control processing system or the requesting CPE unit;
the query cell contains a request for information needed from the resource unit; and
the resource unit transmits a response cell carrying requested information to the requesting CPE unit.

52. The broadband intelligent network of claim 2 wherein:
the service request is for the data which includes educational data for distance learning; and
the resource unit(s) contains the educational data.

53. The broadband intelligent network of claim 2 wherein the resource system includes a linking directory data base; and
the network control processing system sends queries to the linking directory data base to identify at least one of a host resource unit and a source resource unit for connection to the requesting CPE in providing the requested service.

54. The method of claim 30, wherein the network resource system includes a linking directory database, and the method further comprises the step of:
sending a query from the network control processing system to the linking directory data base to identify one or more host or source resource units for connection to the requesting CPE in providing the requested service.

55. The broadband intelligent network of claim 2 wherein:
the program module is a computer program module;
the requested computer program module is stored in the network control processing system from which it is downloaded to the requesting CPE unit through the fast-packet switch; and
the requested computer program module is provided in a version compatible with an operating system interface for application programs in the requesting CPE unit.

56. The broadband intelligent network of claim 55 wherein the version of the requested computer program module is determined from a request from the requesting CPE unit or from customer data stored in the network.

57. The broadband intelligent network of claim 3 wherein the resource unit is a host depository unit, and the one of the program module and the data is downloaded from the requesting CPE to the host depository unit to provide a backup copy of one of the program module and the data for subsequent access if an access need arises.

58. The broadband intelligent network of claim 19 wherein the need for one of server devices and or service circuits is detected from a request transmitted from the CPE unit to the network control processing system.

59. The broadband intelligent network of claim 19 wherein the need for service devices or server circuits is detected by the network control processing system from customer data stored in the network.

60. The broadband intelligent network of claim 5 wherein the requested computer program module is provided in a version compatible with an operating system interface for application programs in the requesting CPE unit.

61. The broadband intelligent network of claim 60 wherein the version of the downloaded program is determined from a request from the requesting CPE or from customer data stored in the network.

62. The broadband intelligent network of claim 2 wherein the network control processing system detects request data for a combination of program modules and data for downloading from the resource units to the requesting CPE unit to provide a requested personality for the requesting CPE unit.

63. The broadband intelligent network of claim 9 wherein the service creation program is stored in the network control processing system from which it is downloaded to the requesting CPE unit.

64. The broadband intelligent network of claim 20 wherein the system library of service circuits is an intelligent services peripheral.

65. The broadband intelligent network of claim 2 wherein the data represents an existing service script which is requested to be downloaded from the network to the requesting CPE unit, and the script is downloaded from a network storage location through one of the first and second associated virtual circuits in the fast-packet switch from the network control processing system or the resource unit to the requesting CPE unit.

66. The method of claim 41 wherein a second interface circuit is provided for coupling the ISP to a circuit-switched network, and wherein the method further comprises the step of:
operating the service circuits through the second interface circuit to provide requested services in the circuit-switched network.

67. The broadband intelligent network of claim 2 wherein:
the download request is for the data which provides a menu listing additional resource units that can be queried by the requesting CPE unit to obtain respective lists of selections available from the respective additional resource units; and
the menu data is downloaded from its storage location to the requesting CPE unit through the first associated virtual circuit or another associated virtual circuit established by the network control processing system from the menu storage location to the requesting CPE unit.

68. The broadband intelligent network of claim 67 wherein the available resource units include units housing respective libraries of movies or videos for downloading to CPE units.

69. The broadband intelligent network of claim 68 wherein an additional download request is made by the requesting CPE for a movie or video selection from one of the additional resource units and the requested movie or video is downloaded from the one additional resource unit through the second associated virtual circuit.

70. The broadband intelligent network of claim 69 wherein the requesting CPE unit receives the selected movie or video and further includes:
a VCR control unit for applying VCR control functions to the selected movie or video.

71. The method of claim 31 wherein the download request is for the data providing a menu listing available resource units that can be queried by the requesting CPE unit to obtain respective lists of selections available from the respective available resource units, and the method further comprises the step of:

downloading the menu data from its storage location to the requesting CPE unit through the first associated virtual circuit or another associated virtual circuit established by the network control processing system from the menu storage location to the requesting CPE unit.

72. The method of claim 71 further comprising the steps of:

operating the requesting CPE to make an additional download request for a movie or video selection from one of the available resource units; and downloading the requested movie or video from the one available resource unit through the second associated virtual circuit.

73. The method of claim 72 wherein the requesting CPE unit receives the selected movie or video and the steps further comprise:

applying VCR control functions to the selected movie or video.

74. A broadband intelligent network comprising:

a fast-packet switch having a plurality of ports;

a switch processor to establish switched virtual connections or permanent virtual connections between ports;

respective customer links having a broad digital bandwidth connected to predetermined customer switch ports for transporting signaling and data cells to and from respective customer premises equipment (CPE) units;

a network control processing system interfaced to at least one switch port to receive signaling cells, generated by CPE units and carrying customer service request data, and to control network responses thereto;

the switch processor detecting each signaling cell generated by a requesting CPE unit and received by the fast-packet switch and routing each such signaling cell through a first associated virtual circuit to the network control processing system through the one switch port;

the network control processing system detecting service request data in each signaling cell requesting a conference call involving the requesting CPE unit and at least second and third CPE units; and the network control processing system directing the switch processor to establish additional virtual circuits through the fast-packet switch among the requested second and third CPE units.

75. The broadband intelligent network of claim 74 wherein:

the additional virtual circuits include direct two-way connection paths between each pairing of the requesting and second and third CPE units;

each of the direct connection paths includes at least one of two-way video channels and data channels;

an audio bridge is provided in the network; and the additional virtual circuits include two-way voice signal paths from each of the requesting first and second CPE units to inputs of the audio-bridge which generates an output equal to the sum of the inputs.

76. The broadband intelligent network of claim 74 wherein:

a resource system is provided for the network and has a plurality of resource units interfaced to respective resource unit ports of the fast-packet switch to receive query cells from the network control processing system and to transmit response cells;

the conference call request further includes a request for connection to a predetermined resource unit.

77. The broadband intelligent network of claim 75 wherein:

a resource system is provided for the network and has a plurality of resource units interfaced to respective resource unit ports of the fast-packet switch to receive query cells from the network control processing system and to transmit response cells;

the conference call request further includes a request for connection to a predetermined resource unit; and the virtual circuits further include direct connection paths between the predetermined resource unit and each of the requesting and second and third CPE units.

78. A method for operating a broadband intelligent network having a fast-packet switch with a plurality of ports, a switch processor to establish switched virtual connections or permanent virtual connections between ports, respective customer links having a relatively broad digital bandwidth connected to predetermined customer switch ports for transporting signaling and data cells to and from respective customer premises equipment (CPE) units, a network control processing system interfaced to at least one switch port to receive signaling cells, generated by CPE units and carrying customer service request data, and to control network responses thereto, and wherein the steps of the method comprise:

detecting each signaling cell generated by a requesting CPE unit and received by the fast-packet switch; and routing each such signaling cell through a first associated virtual circuit and the one switch port to the network control processing system;

detecting service request data in each signaling cell requesting a conference call involving the requesting CPE unit and at least second and third CPE units; and directing the switch processor to establish additional virtual circuits through the fast-packet switch among the requesting and second and third CPE units.

\* \* \* \* \*